United States Patent
Torrey et al.

(10) Patent No.: US 6,535,599 B1
(45) Date of Patent: Mar. 18, 2003

(54) SYSTEM AND METHOD FOR PROCESSING PORTED CALLS

(75) Inventors: Jason P. Torrey, Overland Park, KS (US); Dean C. Boldt, Parkville, MO (US); William L. Wiley, Atlanta, GA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/435,565

(22) Filed: Nov. 8, 1999

(51) Int. Cl.[7] ............................ H04J 3/12; H04M 3/42; H04M 7/00
(52) U.S. Cl. ................. 379/221.13; 370/397; 370/409; 370/410; 370/522; 379/211.02; 379/230
(58) Field of Search ................... 370/395.1, 395.2, 370/397, 399, 409, 410, 522; 379/211.02, 220.01, 221.13, 221.14, 230

(56) References Cited

U.S. PATENT DOCUMENTS

| | | | | |
|---|---|---|---|---|
| 5,937,053 A | * | 8/1999 | Lee et al. | 379/221.09 |
| 5,940,492 A | * | 8/1999 | Galloway et al. | 379/221.13 |
| 5,949,871 A | * | 9/1999 | Kabay et al. | 370/389 |
| 6,064,887 A | * | 5/2000 | Kallioniemi et al. | 379/219 |
| 6,078,584 A | * | 6/2000 | Mottishaw et al. | 370/385 |
| 6,078,657 A | * | 6/2000 | Alfieri et al. | 379/220.01 |
| 6,097,801 A | | 8/2000 | Williams et al. | 379/221.13 |
| 6,098,094 A | | 8/2000 | Barnhouse et al. | 709/203 |
| 6,298,043 B1 | | 10/2001 | Mauger et al. | 370/248 |

OTHER PUBLICATIONS

Hoffpauir, et al., Application Provider and Method for Communication, H1,895, Published: Oct. 3, 2000.
Hoffpauir et al., Network Management System Server and Method for Operation, Reg. No.: H1,896, Published: Oct. 3, 2000.
Fletcher et al., "Merged Operations and Maintenance Center and Method For Operation," Reg. No.: H1,897, Published: Oct. 3, 2000.

* cited by examiner

*Primary Examiner*—Harry S. Hong
(74) *Attorney, Agent, or Firm*—Harley R. Ball; Steven J. Funk; Kevin D. Robb

(57) ABSTRACT

A system and method for connecting a call processes call signaling to determine if a call is a ported call or a non-ported call. A signaling processor determines if a ported number parameter (PNP), such as a forward call indicator (FCI) bit M and/or a ported number generic address parameter (GAP), is present. If the PNP is not present and the signaling processor determines the dialed number is a member of a portable number plan area and central office code combinations (NPA-NXX), the signaling processor queries a ported number database (PNDB). The PNDB responds with the called number dialed digits if the call is not a ported call or a location routing number (LRN) if the call is a ported call. The signaling processor appends a 1 to the nature of address (NOA) subfield of the called party number (CdPN) field if the call is a ported call. The signaling processor then partitions the call signaling parameters between ported or non-ported routing table translations, depending on whether the NOA is appended or not, to determine call routing connections and new call signaling. The appended 1 of the appended NOA is removed prior to building an outgoing call signaling message.

222 Claims, 18 Drawing Sheets

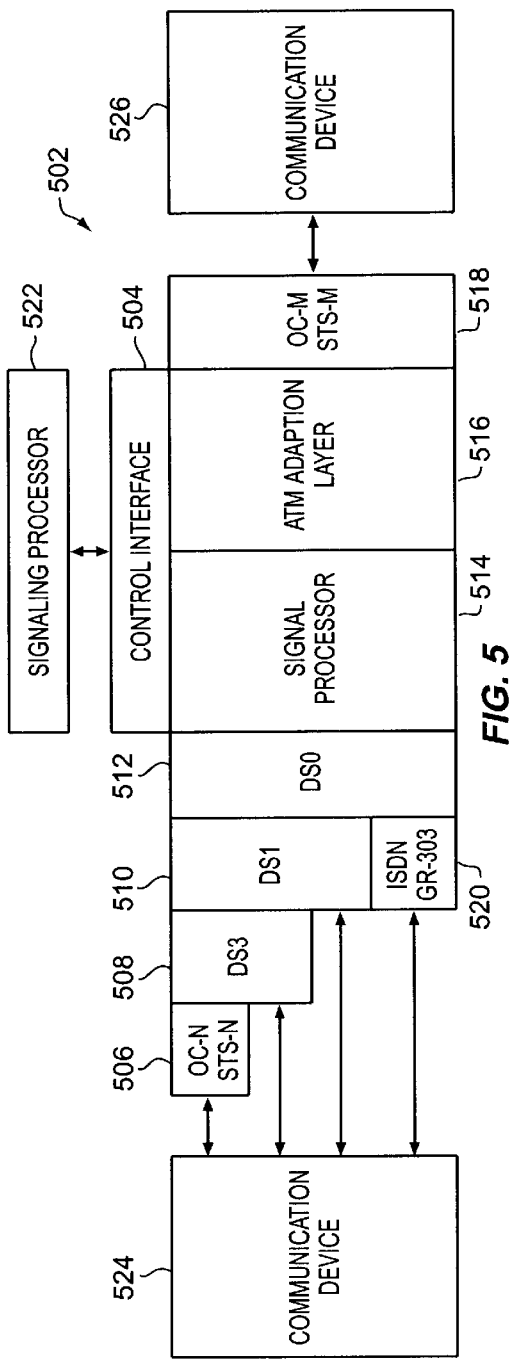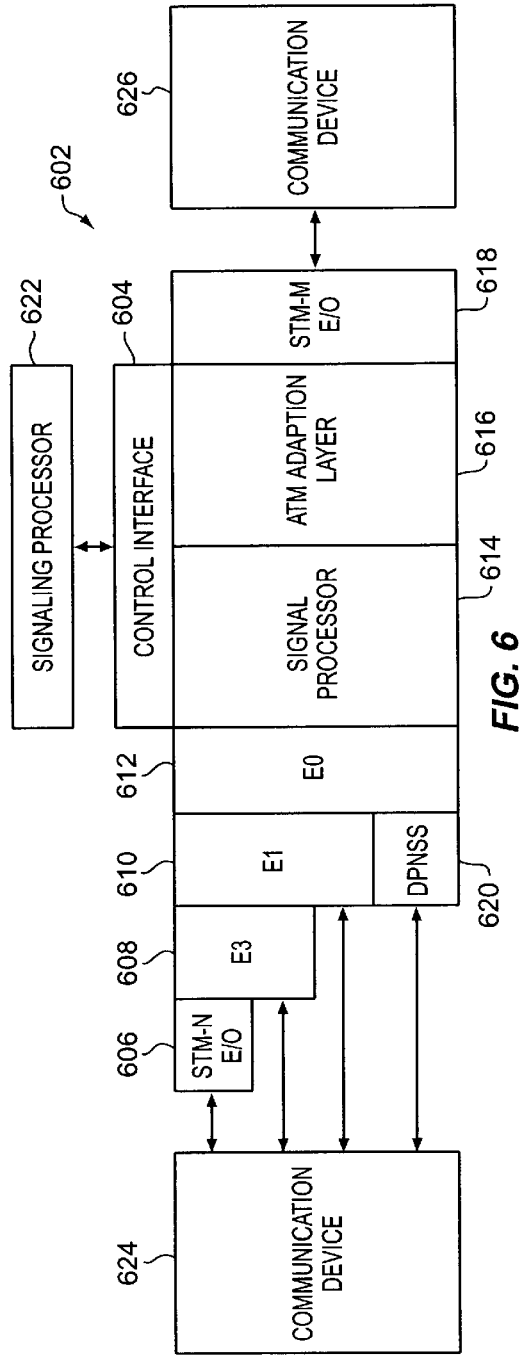

| TRUNK GROUP NUMBER | GROUP MEMBER | TCIC | EC LABEL | IWU LABEL | IWU PORT | DS1/E1 LABEL | DS1/E1 CHANNEL | INITIAL STATE |
|---|---|---|---|---|---|---|---|---|
| | | | | | | | | |
| | | | | | | | | |

FIG. 12

| TRUNK GROUP NUMBER | GROUP SIZE | STARTING CIC | TRANSMIT INTERFACE LABEL | TRANSMIT VPI | RECEIVE INTERFACE LABEL | RECEIVE VPI | INITIAL STATE |
|---|---|---|---|---|---|---|---|
| | | | | | | | |
| | | | | | | | |

FIG. 13

| TRUNK GROUP NUMBER | ADMIN INFORMATION | ASSOCIATED POINT CODE | CLLI | TRUNK TYPE | ASSOCIATED NPA | ASSOCIATED JIP | TIME ZONE LABEL | ECHO CANCELLER INFORMATION |
|---|---|---|---|---|---|---|---|---|
| | | | | | | | | |
| | | | | | | | | |

FIG. 14A

| SATELLITE | SELECT SEQUENCE | IWU PRIORITY | GLARE RESOLUTION | CONTINUITY CONTROL | REATTEMPTS | IGNORE LNP INFORMATION | TREATMENT LABEL | MESSAGE MAPPING LABEL |
|---|---|---|---|---|---|---|---|---|
| | | | | | | | | |
| | | | | | | | | |

FIG. 14B

| QUEUE | RING NO ANSWER | VOICE PATH CUT THROUGH | ORIGINATING COS LABEL | TERMINATING COS LABEL | CALL CONTROL | NEXT FUNCTION | NEXT LABEL |
|---|---|---|---|---|---|---|---|
| | | | | | | | |
| | | | | | | | |

| CARRIER LABEL | CARRIER ID | CARRIER SELECTION | NEXT FUNCTION | NEXT LABEL |
|---|---|---|---|---|
| | | | | |
| | | | | |

FIG. 16

| EXCEPTION LABEL | CALLING PARTY'S CATEGORY | CALLED NUMBER | | NEXT FUNCTION | NEXT LABEL |
|---|---|---|---|---|---|
| | | NATURE OF ADDRESS | DIGITS FROM | DIGITS TO | | |
| | | | | | | |

FIG. 17

| OLI LABEL | ORIGINATION LINE INFORMATION | NEXT FUNCTION | NEXT LABEL |
|---|---|---|---|
| | | | |

FIG. 18

| ANI LABEL | CHARGE CALLING PARTY NUMBER | | TIME ZONE LABEL | CUSTOMER INFORMATION | EC INFORMATION | QUEUE TREATMENT LABEL | NEXT FUNCTION | NEXT LABEL |
|---|---|---|---|---|---|---|---|---|
| | DIGITS FROM | DIGITS TO | | | | | | |
| | | | | | | | | |

FIG. 19

| CALLED NUMBER SCREENING LABEL | CALLED NUMBER | | | DELETE DIGITS | NEXT FUNCTION | NEXT LABEL |
|---|---|---|---|---|---|---|
| | NATURE OF ADDRESS | DIGITS FROM | DIGITS TO | | | |
| | | | | | | |

| CALLED NUMBER LABEL | CALLED NUMBER | | NEXT FUNCTION | NEXT LABEL |
| --- | --- | --- | --- | --- |
| | NATURE OF ADDRESS | DIGITS FROM | DIGITS TO | | |
| | | | | | |
| | | | | | |

FIG. 20

| DAY OF YEAR LABEL | DATE | NEXT FUNCTION | NEXT LABEL |
| --- | --- | --- | --- |
| | | | |
| | | | |

FIG. 21

| DAY OF WEEK | DAY FROM | DAY TO | NEXT FUNCTION | NEXT LABEL |
| --- | --- | --- | --- | --- |
| | | | | |
| | | | | |

FIG. 22

| TIME OF DAY LABEL | TIME FROM | TIME TO | NEXT FUNCTION | NEXT LABEL |
| --- | --- | --- | --- | --- |
| | | | | |
| | | | | |

FIG. 23

| TIME ZONE LABEL | UTC OFFSET | DAYLIGHT SAVINGS |
| --- | --- | --- |
| | | |
| | | |

FIG. 24

| ROUTING LABEL | ROUTE NUMBER | NEXT FUNCTION | NEXT LABEL | SIGNAL ROUTE LABEL |
|---|---|---|---|---|
| | | | | |
| | | | | |

FIG. 25

| ORIGINATING TRUNK COS LABEL | TERMINATING TRUNK COS LABEL | NEXT FUNCTION | NEXT LABEL |
|---|---|---|---|
| | | | |
| | | | |

FIG. 26

| TREATMENT LABEL | ERROR/CAUSE LABEL | NEXT FUNCTION | NEXT LABEL |
|---|---|---|---|
| | | | |
| | | | |

FIG. 27

| OUTGOING RELEASE LABEL | LOCATION | OUTGOING CAUSE VALUE | |
|---|---|---|---|
| | | CODING STANDARD | CAUSE VALUE |
| | | | |
| | | | |

FIG. 28

| PERCENT LABEL | CONTROL PERCENTAGE | CONTROL | | PASSED | |
|---|---|---|---|---|---|
| | | NEXT FUNCTION | NEXT LABEL | NEXT FUNCTION | NEXT LABEL |
| | | | | | |
| | | | | | |

| CALL RATE LABEL | CONTROL | | PASSED | |
|---|---|---|---|---|
| | NEXT FUNCTION | NEXT LABEL | NEXT FUNCTION | NEXT LABEL |
| | | | | |
| | | | | |

| | CALL RATE |
|---|---|
| | |
| | |

FIG. 31

| DATABASE SERVICES LABEL | SCCP LABEL | TCAP LABEL | NEXT FUNCTION | NEXT LABEL |
|---|---|---|---|---|
| | | | | |
| | | | | |

| | SERVICE TYPE |
|---|---|
| | |
| | |

FIG. 32A

| SCCP LABEL | MESSAGE TYPE | PROTOCOL CLASS | MESSAGE HANDLING | HOP COUNTER | SEGMENTATION |
|---|---|---|---|---|---|
| | | | | | |
| | | | | | |

FIG. 32B

| | ISNI | | LABEL |
|---|---|---|---|
| ISNI TYPE | ROUTE INDICATOR | MARK INDICATOR | |
| | | | |
| | | | |

FIG. 32C

| CALLED PARTY ADDRESS | | | | | | GLOBAL TITLE | | | |
|---|---|---|---|---|---|---|---|---|---|
| ADDRESS INDICATOR | | | | SUB SYSTEM NUMBER | PRINT CODE NUMBER | TRANSLATION TYPE | ENCODE SCHEME | NUMBER PLAN | ADDRESS TYPE |
| SSN | POINT CODE | GLOBAL TITLE INDICATOR | ROUTING INDICATOR | NATIONAL/ INTERNATIONAL | | | | | |
| | | | | | | | | | |
| | | | | | | | | | |

FIG. 32D

| CALLING PARTY ADDRESS | | | | | | | | |
|---|---|---|---|---|---|---|---|---|
| ADDRESS INDICATOR | | | | PRINT CODE NUMBER | SUB SYSTEM NUMBER | GLOBAL TITLE | | |
| POINT CODE | GLOBAL TITLE INDICATOR | ROUTING INDICATOR | NATIONAL/ INTERNATIONAL | | | TRANSLATION TYPE | ENCODE SCHEME | NUMBER PLAN | ADDRESS TYPE |
| SSN | | | | | | | | | |
| | | | | | | | | | |

FIG. 33

| ISNI LABEL | NETWORK 1 | NETWORK 2 | NETWORK 3 | NETWORK ... | NETWORK 16 |
|---|---|---|---|---|---|
| | | | | | |

FIG. 34

| TCAP LABEL | TCAP TYPE | TAG CLASS | PACKAGE TYPE | COMPONENT TYPE | MESSAGE TYPE |
|---|---|---|---|---|---|
| | | | | | |

FIG. 35

| ECHO CANCELLER LABEL | ECHO CANCELLER TYPE | RS-232 ADDRESS | MODULE |
|---|---|---|---|
| | | | |

FIG. 36

| IWU LABEL | IWU ID | IP SOCKET 1 | IP SOCKET 2 | IP SOCKET 3 | IP SOCKET 4 |
|---|---|---|---|---|---|
| | | | | | |

FIG. 37

| CAM INTERFACE LABEL | CAM LABEL | LOGICAL INTERFACE |
|---|---|---|
| | | |

| CAM LABEL | CAM TYPE | CAM ADDRESS |
|---|---|---|
|  |  |  |
|  |  |  |

FIG. 38

| OFFICE CLLI NAME | SITE NODE ID | ORIGINATION ID | SOFTWARE ID | CALL PROCESSOR ID |
|---|---|---|---|---|
|  |  |  |  |  |
|  |  |  |  |  |

FIG. 39A

| ACC ENABLED | ACL 1 ONSET | ACL 1 ABATE | ACL 2 ONSET | ACL 2 ABATE | ACL 3 ONSET | ACL 3 ABATE |
|---|---|---|---|---|---|---|
|  |  |  |  |  |  |  |
|  |  |  |  |  |  |  |

FIG. 39B

| MAX TRUNKS OHQ | OHQ TQ1 | OHQ TQ2 | RING NO ANSWER TIMER | BILLING ACTIVE | NWM ALLOW | BILLING FAILURE FREE CALL |
|---|---|---|---|---|---|---|
|  |  |  |  |  |  |  |
|  |  |  |  |  |  |  |

FIG. 39C

| MAX HOP COUNTS | MAX TABLE LOOKUPS |
|---|---|
|  |  |
|  |  |

FIG. 39D

| AIN EVENT PARAMETERS LABEL | MESSAGE NAME #1 | MESSAGE NAME # ... | MESSAGE NAME #N |
|---|---|---|---|
| ACCESS CODE | | | |
| ACG ENCOUNTERED | | | |
| ALTERNATE BILLING INDICATOR | | | |
| ALTERNATE TRUNK GROUP | | | |
| AMA ALTERNATE BILLING NUMBER | | | |
| AMA BUSINESS CUSTOMER ID | | | |
| AMA DIGITS DIALED WC | | | |
| AMA LINE NUMBER | | | |
| AMA SLPID | | | |
| AMP | | | |
| ANSWER INDICATOR | | | |
| BEARER CAPABILITY | | | |
| BUSY CAUSE | | | |
| CALLED PARTY ID | | | |
| CALLED PARTY STATION TYPE | | | |
| CALLING PARTY BGID | | | |
| CARRIER | | | |
| CHARGE NUMBER | | | |
| CHARGE PARTY STATION TYPE | | | |
| CLEAR CAUSE | | | |
| COLLECTED ADDRESS INFORMATION | | | |
| COLLECTED DIGITS | | | |
| CONTROLLING LEG TREATMENT | | | |
| DISCONNECT FLAG | | | |
| DISPLAY TEXT | | | |
| FACILITY GID (TRUNK GROUP ID) | | | |
| FACILITY GID (PRIVATE FACILITY GID) | | | |
| FACILITY GID (ROUTE INDEX) | | | |
| FACILITY MEMBER ID | | | |
| FAILURE CAUSE | | | |
| GENERIC NAME | | | |
| ISDN INTERFACE ID | | | |
| LATA | | | |
| ORIGINAL CALLED PARTY ID | | | |
| OUTPULSE NUMBER | | | |
| OVERFLOW BILLING NUMBER | | | |
| PASSIVE LEG TREATMENT | | | |
| PRIMARY BILLING INDICATOR | | | |
| PRIMARY CARRIER | | | |
| PRIMARY TRUNK GROUP | | | |
| REDIRECTING PARTY ID | | | |
| REDIRECTION INFORMATION | | | |
| RESOURCE TYPE | | | |
| SECOND ALTERNATE BILLING INDICATOR | | | |
| SECOND ALTERNATE CARRIER | | | |
| SECOND ALTERNATE TRUNK GROUP | | | |
| SPID | | | |
| STR PARAMETER BLOCK | | | |

*FIG. 40A*

| AIN EVENT PARAMETERS LABEL | MESSAGE NAME #1 | MESSAGE NAME # ... | MESSAGE NAME #N |
|---|---|---|---|
| TCM | | | |
| TRIGGER CRITERIA TYPE | | | |
| USER ID | | | |
| VERTICAL SERVICE CODE | | | |
| APPLICATION ERROR STRING | | | |
| ERROR CAUSE | | | |
| FAILED MESSAGE | | | |
| CONNECT TIME | | | |
| CONTROL CAUSE INDICATOR | | | |
| ECHO DATA | | | |
| FACILITY STATUS | | | |
| GAP DURATION | | | |
| GAP INTERVAL (NATIONAL GAP INTERVAL) | | | |
| GAP INTERVAL (PRIVATE GAP INTERVAL) | | | |
| GLOBAL TITLE VALUE | | | |
| MONITOR TIME | | | |
| STATUS CAUSE | | | |
| TERMINATION INDICATOR | | | |
| TRANSLATION TYPE | | | |
| TRIGGER CRITERIA FLAG | | | |

*FIG. 40B*

| MESSAGE TYPE | PARAMETERS | INDEX #1 | INDEX # ... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | NOTIFICATION | | | |
| | BACKWARD CALL INDICATOR | | | |
| | ACCESS TRANSPORT | | | |
| | CAUSE INDICATOR | | | |
| | BACKWARD CALL INDICATOR | | | |
| CIRCUIT VALIDATION RESPONSE MESSAGE | CIRCUIT ID NAME | | | |
| | CLLI CODE | | | |
| CONTINUITY | CONTINUITY INDICATOR | | | |
| EXIT | DISPOSITION | | | |
| | TRUNK GROUP NUMBER | | | |
| | SEND BACK EXIT MESSAGE | | | |
| INITIAL ADDRESS | FORWARD CALL INDICATOR | | | |
| | CALLING PARTY'S CATEGORY | | | |
| | GENERIC ADDRESS PARAMETER (LNP) | | | |
| | CALLED PARTY NUMBER | | | |
| | CALLING PARTY NUMBER | | | |
| | GENERIC DIGITS | | | |
| | CHARGE NUMBER | | | |
| | ORIGINATING LINE INFORMATION | | | |
| | TRANSIT NETWORK SELECTION | | | |
| | CARRIER SELECTION INFORMATION | | | |
| | ORIGINATING LINE INFORMATION | | | |
| | SERVICE CODE | | | |
| | CARRIER IDENTIFICATION | | | |
| | ORIGINAL CALLED NUMBER | | | |
| | REDIRECTING NUMBER | | | |
| | REDIRECTION INFORMATION | | | |
| | GENERIC ADDRESS (NON-LNP) | | | |
| | ACCESS TRANSPORT | | | |
| | HOP COUNTER | | | |
| | JURISDICTION INFORMATION | | | |
| RELEASE | ACCESS TRANSPORT | | | |
| | AUTOMATIC CONGESTION CONTROL | | | |

*FIG. 41*

SYSTEM AND METHOD FOR PROCESSING PORTED CALLS

RELATED APPLICATIONS

Not Applicable

FEDERALLY SPONSORED RESEARCH OR DEVELOPMENT

Not Applicable

MICROFICHE APPENDIX

Not Applicable

1. Field of the Invention

The present invention relates to the field of telecommunications call switching and transport and, more particularly, for processing calls and making connections for calls to ported numbers.

2. Background of the Invention

Broadband systems provide telecommunications providers with many benefits, including greater bandwidth, more efficient use of bandwidth, and the ability to integrate voice, data, and video communications. These broadband systems provide callers with increased capabilities at lower costs.

The broadband systems now are implementing systems and methods for connecting calls to ported numbers. In prior systems, if an originating switch determines that a call is to be connected to a ported number, the originating switch added additional partitioning information to the call signaling. Sometimes the additional information is proprietary to the switching entity.

A switch that received the call signaling with the additional information then had to translate the additional information to determine if the dialed number is ported and to determine the routing location for any dialed number that is ported. Also, if the additional information is proprietary, the terminating switch had to be capable of processing the proprietary information.

Thus, a system and method are needed that can process calls to ported numbers and to partition the calls to ported numbers during call processing so that they may be easily processed. A system and method are needed that do not require additional information to be added to call signaling and that can process and route calls based on standard, non-proprietary information in call signaling. The present invention fulfills these and other needs.

SUMMARY OF THE INVENTION

The present invention comprises a system for connecting a call having call signaling. The system comprises a signaling processor that is adapted to receive the call signaling. The signaling processor can process the call signaling by partitioning the call for processing within the signaling processor as a ported call by appending a 1 to a ported number processing parameter of a call signaling parameter. The signaling processor can process the call signaling by partitioning the call for processing within the signaling processor as a non-ported call by not appending the 1 to the ported number processing parameter.

The present invention also includes a system for connecting a call having call signaling. The system comprises a signaling processor adapted to receive the call signaling. The signaling processor processes the call signaling by partitioning the call for processing as a ported call by appending a 1 to a nature of address field of a called number party parameter. The signaling processor can process the call signaling by partitioning the call for processing as a non-ported call by not appending the 1 to the nature of address field.

Further, the present invention includes a system for connecting a call having call signaling. The system comprises a signaling processor that is adapted to receive the call signaling and to process the call signaling to determine if a ported number parameter is present. If the ported number parameter is present, the signaling processor partitions the call for processing as a ported call by appending a 1 to a ported number processing parameter.

Further still, the present invention comprises a system for connecting a call having call signaling. The system comprises a signaling processor adapted to receive the call signaling and to process the call signaling to determine if the call is a ported call. If the call is the ported call, the signaling processor partitions the call for further processing within the signaling processor as a ported call by appending a 1 to a ported number processing parameter.

Further yet, the present invention comprises a system for connecting a call having call signaling. The system comprises a signaling processor adapted to receive the call signaling and to process the call signaling to determine if the call is a ported call. If the call is the ported call, the signaling processor partitions the call for further processing within the signaling processor as a ported call by appending a 1 to a nature of address field of a called party number field parameter of the call signaling.

The present invention is directed to a method for connecting a call having call signaling. The method comprises receiving the call signaling and processing the call signaling. The method includes partitioning the call for processing as a ported call by appending a 1 to a ported number processing parameter of a call signaling parameter. The method also includes partitioning the call for processing as a non-ported call by not appending the 1 to the ported number processing parameter.

The present invention is further directed to a method for connecting a call having call signaling. The method comprises receiving the call signaling and processing the call signaling. The method further comprises partitioning the call for processing as a ported call by appending a 1 to a nature of address field of a called number party parameter. Further, the method comprises partitioning the call for processing as a non-ported call by not appending the 1 to the nature of address field.

The present invention also is directed to a method for connecting a call having call signaling. The method comprises receiving the call signaling and processing the call signaling to determine if a ported number parameter is present. The call is partitioned for processing as a ported call by appending a 1 to a ported number processing parameter if the ported number parameter is present.

In addition, the present invention is directed to a method for connecting a call having call signaling. The method comprises receiving the call signaling and processing the call signaling to determine if the call is a ported call. The call is partitioned for further processing as the ported call by appending a 1 to a ported number processing parameter if the call is the ported call.

Moreover, the present invention is directed to a method for connecting a call having call signaling. The method comprises receiving the call signaling and processing the call signaling to determine if the call is a ported call. The call is partitioned for further processing as the ported call by appending a 1 to a nature of address field of a called party number field parameter of the call signaling if the call is the ported call.

The systems may further include a communication device that can receive, handle, and/or transmit call signaling, user communications, and/or control messages. The methods may further comprise receiving, handling, and/or transmitting call signaling, user communications, and/or control messages at a communication device.

BRIEF DESCRIPTION OF THE DRAWINGS

FIG. 5 is a functional diagram of an asynchronous transfer mode interworking unit for use with a synchronous optical network system in accordance with the present invention.

FIG. 6 is a functional diagram of an asynchronous transfer mode interworking unit for use with a synchronous digital hierarchy system in accordance with the present invention.

FIG. 12 is a table diagram of a time division multiplex trunk circuit table used in the signaling processor of FIG. 8.

FIG. 13 is a table diagram of an asynchronous transfer mode trunk circuit table used in the signaling processor of FIG. 8.

FIG. 14A is a table diagram of a trunk group table used in the signaling processor of FIG. 8.

FIG. 14B is a continuation table diagram of the trunk group table of FIG. 14A.

FIG. 14C is a table diagram of a continuation of the trunk group table of FIG. 14B.

FIG. 15 is a table diagram of a carrier table used in the signaling processor of FIG. 8.

FIG. 16 is a table diagram of an exception table used in the signaling processor of FIG. 8.

FIG. 17 is a table diagram of an originating line information table used in the signaling processor of FIG. 8.

FIG. 18 is a table diagram of an automated number identification table used in the signaling processor of FIG. 8.

FIG. 19 is a table diagram of a called number screening table used in the signaling processor of FIG. 8.

FIG. 20 is a table diagram of a called number table used in the signaling processor of FIG. 8.

FIG. 21 is a table diagram of a day of year table used in the signaling processor of FIG. 8.

FIG. 22 is a table diagram of a day of week table used in the signaling processor of FIG. 8.

FIG. 23 is a table diagram of a time of day table used in the signaling processor of FIG. 8.

FIG. 24 is a table diagram of a time zone table used in the signaling processor of FIG. 8.

FIG. 25 is a table diagram of a routing table used in the signaling processor of FIG. 8.

FIG. 26 is a table diagram of a trunk group class of service table used in the signaling processor of FIG. 8.

FIG. 27 is a table diagram of a treatment table used in the signaling processor of FIG. 8.

FIG. 28 is a table diagram of an outgoing release table used in the signaling processor of FIG. 8.

FIG. 29 is a table diagram of a percent control table used in the signaling processor of FIG. 8.

FIG. 30 is a table diagram of a call rate table used in the signaling processor of FIG. 8.

FIG. 31 is a table diagram of a database services table used in the signaling processor of FIG. 8.

FIG. 32A is a table diagram of a signaling connection control part table used in the signaling processor of FIG. 8.

FIG. 32B is a continuation table diagram of the signaling connection control part table of FIG. 32A.

FIG. 32C is a continuation table diagram of the signaling connection control part table of FIG. 32B.

FIG. 32D is a continuation table diagram of the signaling connection control part table of FIG. 32C.

FIG. 33 is a table diagram of an intermediate signaling network identification table used in the signaling processor of FIG. 8.

FIG. 34 is a table diagram of a transaction capabilities application part table used in the signaling processor of FIG. 8.

FIG. 35 is a table diagram of a external echo canceller table used in the signaling processor of FIG. 8.

FIG. 36 is a table diagram of an interworking unit used in the signaling processor of FIG. 8.

FIG. 37 is a table diagram of a controllable asynchronous transfer mode matrix interface table used in the signaling processor of FIG. 8.

FIG. 38 is a table diagram of a controllable asynchronous transfer mode matrix table used in the signaling processor of FIG. 8.

FIG. 39A is a table diagram of a site office table used in the signaling processor of FIG. 8.

FIG. 39B is a continuation table diagram of the site office table of FIG. 39A.

FIG. 39C is a continuation table diagram of the site office table of FIG. 39B.

FIG. 39D is a continuation table diagram of the site office table of FIG. 39C.

FIG. 40A is a table diagram of an advanced intelligent network event parameters table used in the signaling processor of FIG. 8.

FIG. 40B is a continuation table diagram of the advanced intelligent network event parameters table of FIG. 40A.

FIG. 41 is a table diagram of a message mapping table used in the signaling processor of FIG. 8.

DETAILED DESCRIPTION

Figure 1:
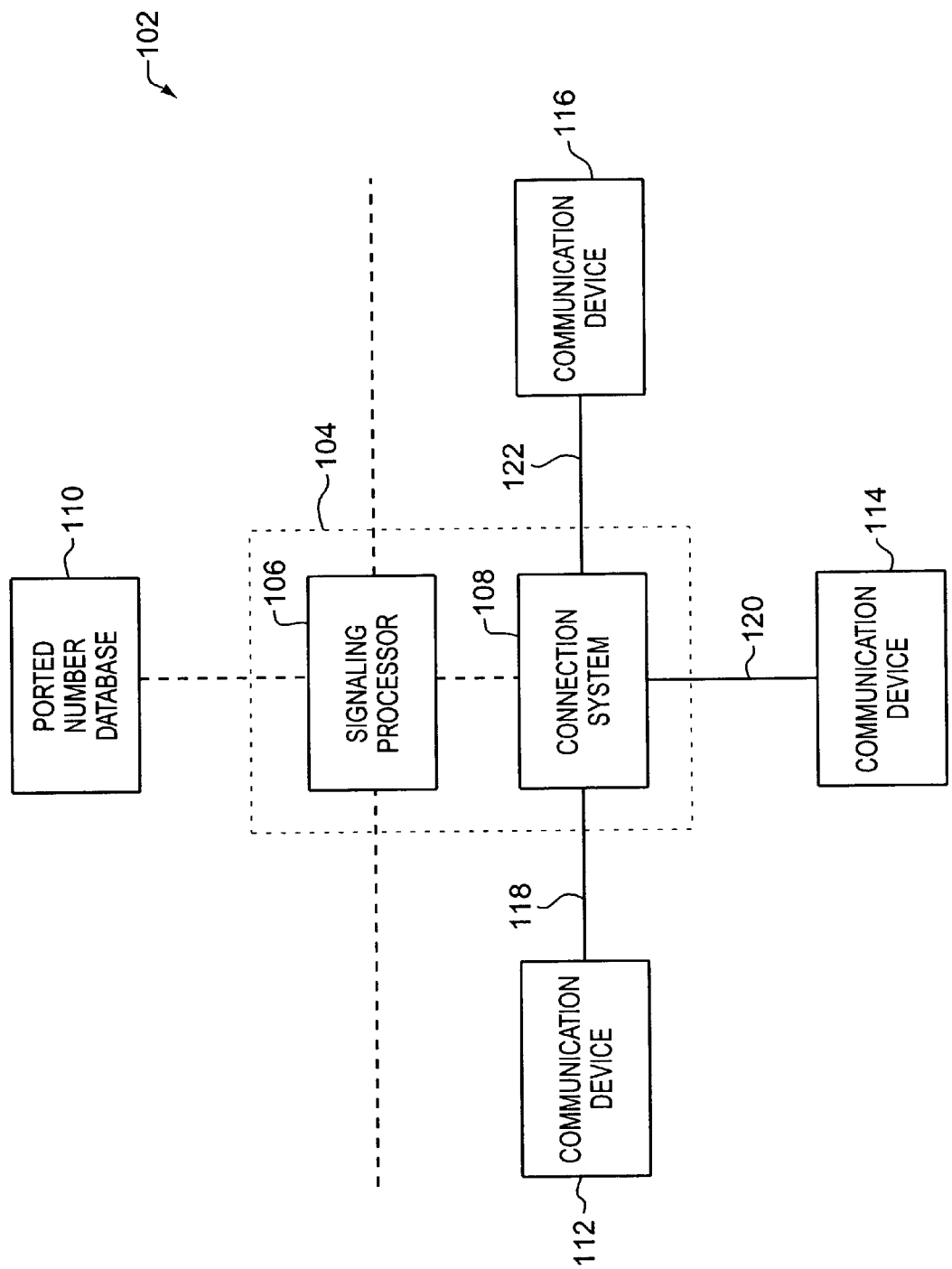
FIG. 1 is a block diagram of a call connecting system of the present invention.

Telecommunication systems have a number of communication devices in local exchange and interexchange environments that interact to provide call services to customers. Both traditional and intelligent network (IN) services and resources are used to process, route, or connect a call to a designated connection.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.931. A call can be connected to and from communication devices.

Connections are used to transport user communications and other device information between communication devices and between the elements and devices of the system. The term "connection" as used herein means the transmission media used to carry user communications between elements of the various telecommunications networks and systems. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as that used in SS7, C7, ISDN, DPNSS, B-ISDN, GR-303, or could be via local area network (LAN), or data bus call signaling. A link can be, for example, an asynchronous transfer mode (ATM) adaptation layer 5 (AAL5) data link, user datagram protocol/internet protocol (UDP/IP), ethernet, digital signal level zero (DS0), or digital signal level one (DS1). In addition, a link, as shown in the figures, can represent a single physical link or multiple links, such as one link or a combination of links of ISDN, SS7, transmission control protocol/internet protocol (TCP/IP), or some other data link. The term "control message" as used herein means a control or signaling message, a control or signaling instruction, or a control or signaling signal, whether proprietary or standardized, that conveys information from one point to another.

The system of the present invention has the ability to route calls having ported numbers with a location routing number (LRN) differently from non-ported calls. As used herein, a "ported call" means a call that has a dialed number that has ported. As used herein, a "non-ported call" means a call that has a dialed number that has not ported.

Because the LRN or the LRNs assigned to switches are not required to match the number plan area and central office code combinations (NPA-NXX) or the NPA-NXXs served by that switch, a call destined to a particular LRN may be routed differently that a call to an NPA-NXX of the same value. The present invention uses a switch or network specific nature of address (NOA) so that intra-switch call signaling can be processed. Because the ported number calls are to be processed differently to determine the correct connections and/or the correct call signaling for the call, the system advantageously partitions the ported call traffic from the non-ported call traffic during call processing.

The present invention identifies calls for different translations. This means that a call is processed differently inside the switch or call processor to determine one or more routes for call connections and to determine the correct associated call signaling depending on whether the call is a ported call or a non-ported call.

The present system may be used with any call signaling. Preferably, however, the present invention is used with SS7 signaling.

With SS7 signaling, an initial address message (IAM) has a called party number (CdPN) field. For a typical IAM which does not include ported call information, the CdPN includes the dialed number digits for the called party. When a query is made to a ported number database (PNDB), and the response from the PNDB includes an LRN, the LRN digits are placed in the CdPN field.

The CdPN has an NOA subfield. The NOA is a seven bit field that is used to designate the call as being, among other things, a subscriber number, a national number, or an international number. Other designations for the NOA exist. For ported calls, the NOA is set to designate a national number.

The IAM also includes a forward call indicator (FCI) parameter, such as bit M. This FCI parameter is used to indicate whether or not a query has been made to determine if a dialed number is ported and a response was received from the queried communication device. When a switch or other call processor queries a PNDB and receives a response with an LRN, the FCI parameter is set to one to indicate that the number has been translated from the dialed number digits to the LRN. If the switch or other call processor does not translate the digits, or if the number is not ported, the FCI parameter is set to zero to indicate that the number has not been translated.

When a switch or other call processor determines that a call is ported, the switch or call processor adds a ported number generic address parameter (GAP) to the IAM. The ported number GAP has the same format as the standard integrated service user part (ISUP) GAP. However, because the LRN is stored in the CdPN, the original called number digits are placed in the ported number GAP.

For SS7 systems, if a switch or other call processor determines that a call is ported, it sets the NOA to a designation of national, sets the FCI parameter to indicate a query has been done (set to "translated"), and adds a ported number GAP. The LRN is placed in the CdPN, and the original called number dialed digits are placed in the ported number GAP. Switching and signaling for ported numbers is discussed in the American National Standards Institute (ANSI) technical requirements documents: Technical Requirements for Number Portability-Switching Systems and Technical Requirements for Number Portability-Database and Global Title Translations, the contents of which are incorporated herein by reference.

The system of the present invention can initiate the intra-switch call processing for ported calls upon the determination of a ported number parameter (PNP), such as the FCI parameter setting, the presence of the ported number GAP, or both. It is preferred that the switch or call processor uses the FCI parameter and its setting as either "translated" or "not translated" to initiate or not to initiate the ported number processing, respectively.

If a PNP is present and the dialed number (DN) for the call is ported, the call is routed based upon the LRN digits in the CdPN. If a PNP is present, but the DN is not ported, the call is routed based upon the called number dialed digits in the CdPN. If no PNP is present and the DN is not ported, the call is routed based upon the called number dialed digits in the CdPN. If no PNP is present, but the DN is ported, a query is made to a PNDB to determine the LRN, and the call is routed based on the LRN digits in the CdPN. A PNP may be present in the call signaling for a ported call if a predecessor switch or other call processor determined that the DN was ported, queried a PNDB, received an LRN, and set the PNP.

The present invention uses a ported number processing parameter (PNPP) of a call signaling parameter, such as the NOA subfield of the CdPN field, in the intra-signaling processor call processing to partition ported calls and non-ported calls for call processing. If the DN is ported, a 1 is appended to the PNPP, such as to the seven bit NOA, to designate the call as ported. The new appended PNPP, such as the eight bit NOA field, easily identifies the call signaling parameters for call processing logic as for a ported call. However, the appended 1 is used only for intra-signaling processor call processing, and the appended 1 is removed from the appended PNPP, such as the appended NOA, before new call signaling is built or sent. A PNPP can be any call signaling parameter that is present in the call signaling and used during call processing. Preferably, the NOA parameter is used as the PNPP to partition ported calls from non-ported calls for call processing. Although, any other parameter in the call signaling may be used.

Because the present invention uses the information already present in the call signaling, additional information or call signaling parameters do not need to be added to the call signaling. Moreover, proprietary information is not needed in the call signaling to segregate the ported calls.

FIG. 1 illustrates an exemplary embodiment of a call connecting system of the present invention. The call connecting system 102 of FIG. 1 comprises a call routing system 104, such as a signaling processor 106 and a connection system 108, a PNDB 110, and communications devices 112–116. The connection system 108 is connected to the communication devices 112–116 by the connections 118–122.

The call routing system 104 receives call signaling and user communications. The call routing system 104 processes the call signaling to determine routes for the user communications and to determine new call signaling. The call routing system 104 partitions call traffic for ported calls and for non-ported calls and makes connections based upon the processed call signaling.

The signaling processor 106 is a signaling platforms that can receive, process, and generate call signaling. Based on the processed call signaling, the signaling processor 106 selects processing options, services, or resources for the user communications and generates and transmits control messages that identify the communication device, processing option, service, and/or resource that is to be used. The signaling processor 106 also selects virtual connections and circuit-based connections for call routing and generates and transports control messages that identify the selected connections. The signaling processor 106 can process various forms of signaling, including ISDN, GR-303, B-ISDN, SS7, and C7. The signaling processor 106 uses routing logic and routing tables to process the call signaling. The signaling processor 106 can be identified as a communication device.

The signaling processor 106 determines, based on the call signaling, whether a number may be a ported number. The signaling processor 106 determines whether a previous switch or other call processor has queried an PNDB, whether a query should be sent to an PNDB to obtain an LRN, if existent, and whether information received in a response from an PNDB contains an LRN.

The signaling processor 106 processes the call signaling to determine if the NPA-NXX in the CdPN belongs to a portable switch or other call processor. In addition, the signaling processor 106 determines if a PNP is present. As used herein, the terms "portable switch or other call processor", "portable call processor", "portable switch", or "portable signaling processor" mean a switch or other call processor, a call processor, a switch, or a signaling processor that is open to have a ported dialed number assigned to that switch or other call processor, call processor, switch, or signaling processor, respectively. A portable switch, a portable call processor, or a portable signaling processor may serve one or more NPA-NXXs, and at least one NPA-NXX is open to have a ported dialed number associated with that NPA-NXX.

Preferably, the signaling processor 106 determines if the NPA-NXX belongs to a portable switch or other call processor from which at least one number has ported, referred to herein as a donor switch or other call processor. Although, the signaling processor can be configured to determine if the NPA-NXX belongs to a portable switch or other call processor to which at least one number has ported, referred to herein as a recipient switch or other call processor. The signaling processor 106 can be configured to determine if the NPA-NXX belongs to a recipient switch or a donor switch. A combination of the two methods may be used.

If the signaling processor 106 determines that the DN of the call is ported, the signaling processor appends a 1 to the PNPP. In this example, the signaling processor 106 appends a 1 to the seven bit NOA to make the NOA an eight bit parameter. If the signaling processor 106 determines that the call is not ported, the NOA is not appended and remains a seven bit parameter. The signaling processor 106 then processes the call signaling using the NOA as a key reference for partitioning the processing of the call as either ported or non-ported.

Since the call signaling may be processed differently for ported and non-ported calls, this process allows the signaling processor 106 to more quickly process call signaling and to reduce the processing time since all call signaling need not go through the same routing logic and/or routing tables and be processed in the same manner or sequence.

Once the call signaling has been processed through the routing logic and/or the routing tables and the new call signaling parameters are determined, the appended 1 is removed from an appended PNPP, such as an appended NOA, before new call signaling is built. The new call signaling that is sent from the signaling processor 106 conforms to standard call signaling formats the standard PNPP. In this example, the new call signaling is sent from the signaling processor 106 with a standard seven bit NOA. It will be appreciated that the appended PNPP, such as the appended NOA, is used for intra-signaling processor call processing, that is call processing that occurs within the signaling processor 106 with its routing logic and/or its routing tables, to partition ported calls from non-ported calls to more quickly and easily determine call routing and new call signaling.

The connection system 108 makes connections for calls. The connection system 108 may interwork user communications to connections and/or switch user communications between connections. Preferably, interworking occurs between time division multiplex (TDM) connections and asynchronous transfer mode (ATM) connections. Preferably, switching occurs between ATM connections and other ATM connections and between TDM connections and other TDM connections. The connection system 108 establishes connections for user communications in response to control messages from the signaling processor 106. The connection system 108 can be identified as one or more communication devices.

The communication devices 112–116 comprise other call routing systems such as the call routing system 104, a connection system such as the connection system 108, customer premises equipment (CPE), a service platform, a switch, a remote digital terminal, a cross connect, an interworking unit, an ATM gateway, or any other device capable of initiating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303. An ATM gateway is a device that changes ATM cell header virtual path/virtual channel (VP/VC) identifiers.

The PNDB 110 is a database that contains information for local number portability (LNP). The PNDB 110 responds to LNP queries made from switches or other call processors. The PNDB 110 responds with ported number information. The PNDB 110 responds with an LRN for dialed numbers that have been ported. The PNDB 110 responds with the actual dialed number digits, and not an LRN, for dialed numbers that are not ported. The PNDB 110 can be identified as a communication device.

The system of FIG. 1 operates as follows. In a first example, the communication device 112 handles a call from a prior communication device (not shown). In this example, the call is destined for a communication device, such as a telephone, that is connected to the communication device 116 that has an assigned NPA-NXX. In this example, the communication devices 112 and 116 are switches or other call processors. The communication device 112 transports the call signaling to the signaling processor 106 through a link (not shown) and transmits the user communications to the connection system 108 through a connection 118. In this example, the call signaling is an IAM.

The signaling processor 106 processes the call signaling to determine routing for the call. The signaling processor 106 processes the CdPN information and the information in a PNP parameter, if present. The digits in the CdPN contain an NPA-NXX, and the signaling processor 106 determines if the NPA-NXX belongs to a portable switch from which a number is ported.

In this example, the NPA-NXX belongs to a portable switch or call processor from which a number is ported, and a PNP is present. Therefore, the signaling processor 106 does not query the PNDB 110. The presence of the PNP means that a query to a PNDB has already been made, and an LRN in the response from that query was placed in the CdPN field. In this example, the PNP parameter is the FCI parameter which is set to "translated" and a ported number GAP.

The signaling processor 106 determines a route for the call and determines new call signaling based on the LRN in the CdPN. The signaling processor 106 appends a 1 to the seven bit NOA to make the parameter an eight bit number. The signaling processor 106 processes the call signaling with the appended NOA using routing logic and routing tables to determine the route and the new call signaling. Because the NOA was appended, the call signaling is partitioned and processed as a ported number. Therefore, the translations in the routing tables can more quickly and easily process the called number as a ported number.

After the signaling processor 106 processes the call signaling with the routing logic and the routing tables, the appended 1 is removed from the NOA, thereby making the NOA a seven bit number. At this point the parameters for the new call signaling have been determined and the route for the call has been determined.

The signaling processor 106 creates the new call signaling and transmits the new call signaling to the communication device 116 via a link (not shown). In addition, the signaling processor 106 transmits a control message to the connection system 108 identifying the selected connection 122 over which to connect the call.

The connection system 108 receives the user communications. Also, the connection system 108 receives the control message from the signaling processor 106 and, in response thereto, connects the user communications on the selected connection 122.

In another example, the communication device 114 handles a call from a prior communication device (not shown). In this example, the called number is destined for a communication device, such as a telephone, connected to the communication device 116 that has an assigned NPA-NXX. In this example, the communication devices 112–116 are switches or other call processors.

The communication device 114 transports the call signaling to the signaling processor 106 through a link (not shown) and transmits the user communications to the connection system 108 through a connection 120. In this example, the call signaling is an IAM.

The signaling processor 106 processes the call signaling to determine routing for the call. The signaling processor 106 processes the CdPN information and the information in the PNP parameter, if present. The digits in the CdPN contain an NPA-NXX, and the signaling processor 106 determines if the NPA-NXX belongs to a portable switch from which a number is ported.

In this example, the NPA-NXX belongs to a portable switch or other call processor from which a number is ported, and a PNP parameter is not present. Therefore, a query to a PNDB has not already been made or the results of a query were not transmitted in the call signaling, and the digits in the CdPN are the called number dialed digits. In this example, the signaling processor 106 determines the existence or nonexistence of the ported number GAP as the PNP parameter.

The signaling processor 106 queries the PNDB 110 to determine if the dialed number is ported. The response from the PNDB 110 will contain either an LRN if the called number is ported or the called number dialed digits if the called number is not ported. In this example, the response from the PNDB 110 contains an LRN for the communication device 112, which is a portable switch.

The LRN is used by the signaling processor 106 to determine a route for the call and to determine new call signaling. The signaling processor 106 appends a 1 to the seven bit NOA to make the parameter an eight bit number. The signaling processor 106 processes the call signaling with routing logic and routing tables to determine the route and the new call signaling using the appended NOA. Because the NOA was appended, the call signaling is partitioned and processed as a ported number. Therefore, the translations in the routing tables can more quickly and easily process the called number as a ported number.

After the signaling processor 106 processes the call signaling with the routing logic and the routing tables, the appended 1 is removed from the appended NOA, thereby making the NOA a seven bit number. At this point the parameters for the new call signaling have been determined and the route for the call has been determined.

The signaling processor 106 creates the new call signaling and transmits the new call signaling to the communication device 112 via a link (not shown). In addition, the signaling processor 106 transmits a control message to the connection system 108 identifying the selected connection 118 over which to connect the call.

The connection system 108 receives the user communication. Also, the connection system 108 receives the control message from the signaling processor 106 and, in response thereto, connects the user communications on the selected connection 118 to the communication device 112.

In yet another example, the communication device 114 handles a call from a prior communication device (not shown). In this example, the called number is destined for a communication device, such as a telephone, connected to the communication device 116 that has an assigned NPA-NXX. In this example, the communication devices 114–116 are switches or other call processors.

The communication device 114 transports the call signaling to the signaling processor 106 through a link (not shown) and transmits the user communications to the connection system 108 through a connection 120. In this example, the call signaling is an IAM.

The signaling processor 106 processes the call signaling to determine routing for the call. The signaling processor 106 processes the CdPN information and the information in the PNP parameter, if present. The digits in the CdPN contain an NPA-NXX, and the signaling processor 106 determines if the NPA-NXX belongs to a portable switch from which a number is ported.

In this example, the NPA-NXX belongs to a portable switch or other call processor from which a number is ported, and a PNP parameter is not present. Therefore, a query to a PNDB has not already been made or the results of a query were not transmitted in the call signaling, and the digits in the CdPN are the called number dialed digits. In this example, the PNP parameter is the setting of the FCI parameter to zero or "not translated".

The signaling processor 106 queries the PNDB 110 to determine if the dialed number is ported. The response from the PNDB 110 will contain either an LRN if the called number is ported or the called number dialed digits if the called number is not ported. In this example, the response from the PNDB 110 contains the original called number dialed digits. Therefore, the called number is not ported.

The signaling processor 106 uses the called number dialed digits in the CdPN to determine a route for the call and to determine new call signaling. The signaling processor 106 does not append a 1 to the seven bit NOA. The signaling processor 106 processes the call signaling with routing logic to determine the route and the new call signaling using the original un-appended NOA. Because the NOA was not appended, the call signaling is partitioned and processed as a non-ported number. This means that the translations in the routing tables can more quickly and easily process the called number as a non-ported number.

The signaling processor 106 processes the call signaling with the routing logic and the routing tables. Since the NOA was not appended with a 1, there is nothing to remove. The NOA remains a seven bit number. At this point the parameters for the new call signaling have been determined and the route for the call has been determined.

The signaling processor 106 creates the new call signaling and transmits the new call signaling to the communication device 116 via a link (not shown). In addition, the signaling processor 106 transmits a control message to the connection system 108 identifying the selected connection 122 over which to connect the call.

The connection system 108 receives the user communications. Also, the connection system 108 receives the control message from the signaling processor 106 and, in response thereto, connects the user communications on the selected connection 122 to the communication device 116.

In still another example, the communication device 116 handles a call. In this example, the called number is destined for a communication device, such as a telephone, connected to the communication device 112 that has an assigned NPA-NXX. In this example, the communication devices 112 and 116 are switches or other call processors.

The communication device 116 transports the call signaling to the signaling processor 106 through a link (not shown) and transmits the user communications to the connection system 108 through a connection 122. In this example, the call signaling is an IAM.

The signaling processor 106 processes the call signaling to determine routing for the call. The signaling processor 106 processes the CdPN information and the information in the PNP parameter, if present. The digits in the CdPN contain an NPA-NXX, and the signaling processor 106 determines if the NPA-NXX belongs to a portable switch from which a number is ported.

In this example, the NPA-NXX does not belong to a portable switch or call processor from which a number is ported, a PNP parameter is not present, and a query is not made to the PNDB 110. In this example, the PNP parameter is the FCI parameter set to "not translated".

The signaling processor 106 uses the dialed digits in the CdPN to determine a route for the call and to determine new call signaling. The signaling processor 106 does not append a 1 to the seven bit NOA. The signaling processor 106 processes the call signaling with routing logic to determine the route and the new call signaling using the original un-appended NOA. Because the NOA was not appended, the call signaling is partitioned and processed as a non-ported number. This means that the translations in the routing tables can more quickly and easily process the called number as a non-ported number.

The signaling processor 106 processes the call signaling with the routing logic and the routing tables. Since the NOA was not appended with a 1, a 1 is not removed. The NOA remains a seven bit number. At this point the parameters for the new call signaling have been determined and the route for the call has been determined.

The signaling processor 106 creates the new call signaling and transmits the new call signaling to the communication device 112 via a link (not shown). In addition, the signaling processor 106 transmits a control message to the connection system 108 identifying the selected connection 118 over which to connect the call.

The connection system 108 receives the user communications. Also, the connection system 108 receives the control message from the signaling processor 106 and, in response thereto, connects the user communications on the selected connection 118 to the communication device 118.

Figure 2:
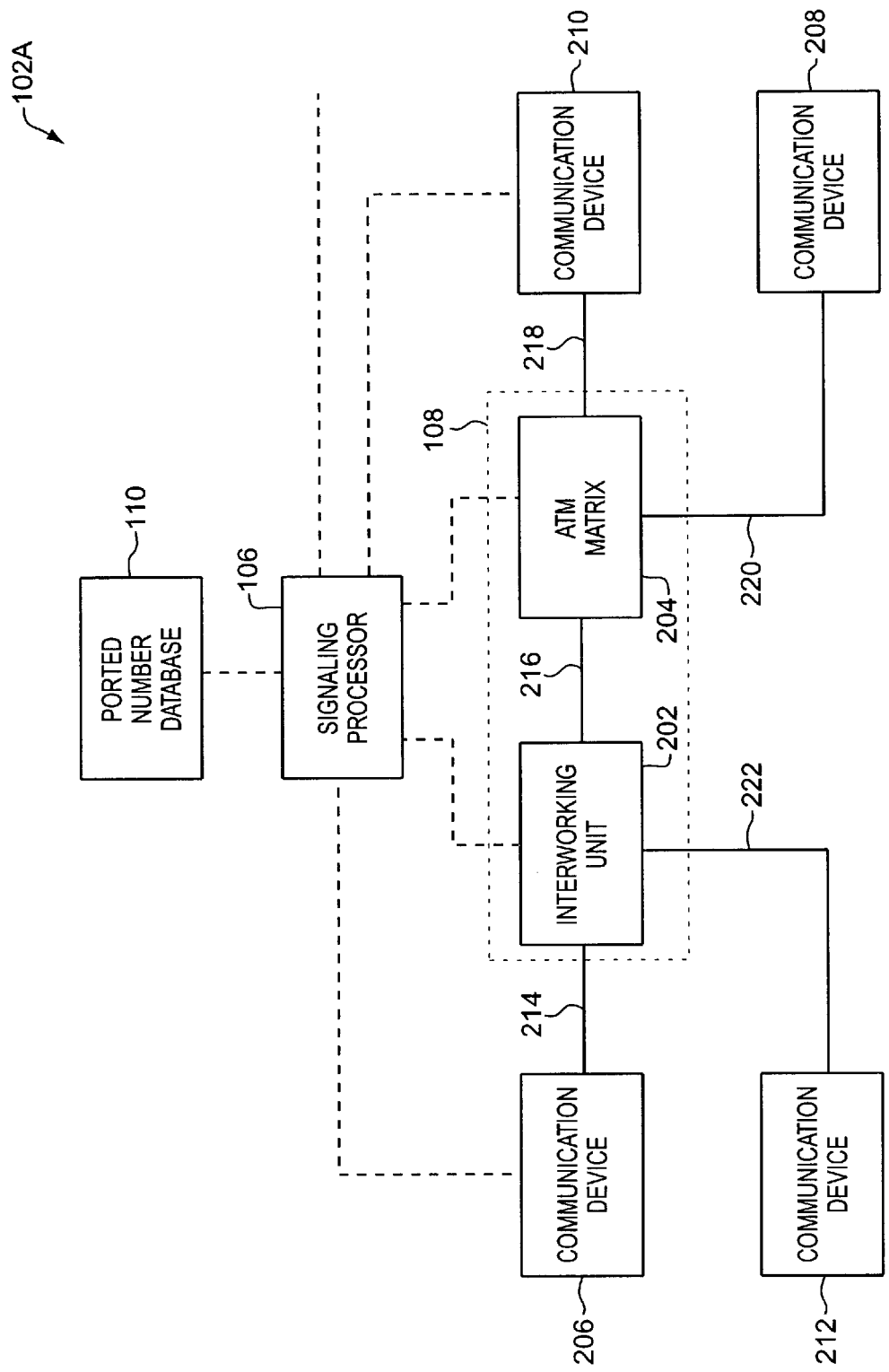
FIG. 2 is a block diagram of a call connecting system with an embodiment of a connection system of the present invention.

FIG. 2 illustrates an exemplary embodiment of a call connecting system of the present invention. The call connecting system 102A of FIG. 2 comprises, in addition to the signaling processor 106 and the PNDB 110 of FIG. 1, an interworking unit 202, an asynchronous transfer mode (ATM) matrix 204, and communication devices 206–212. The interworking unit 202 is connected to the communication device 206 by a connection 214 and to the ATM matrix by a connection 216. The ATM matrix 204 is connected to the communication device 210 by a connection 218 and to the communication device 208 by a connection 220. The interworking unit 202 is connected to the communication device 212 by a connection 222.

It will be appreciated that other communication devices may be present in the connection system 108 of FIG. 2. For example, the connection system of FIG. 2 may have a time division multiplex (TDM) controllable matrix that makes TDM connections to other TDM connections in response to a control message from the signaling processor 106 identifying the connections. Moreover, the connection system 108 of FIG. 2 may have only an interworking unit, only an ATM matrix, only a TDM matrix, or any combination of the interworking unit, the ATM matrix, and the TDM matrix.

The interworking unit 202 interworks traffic between various protocols. Preferably, the interworking unit 202 interworks between ATM traffic and non-ATM traffic, such as TDM traffic. The interworking unit 202 operates in accordance with control messages received from the signaling processor 106. These control messages typically are provided on a call-by-call basis and typically identify an assignment between a DS0 and a VP/VC for which user communications are interworked. In some instances, the interworking unit 202 may transport control messages which may include data to the signaling processor 104. In some instances, the interworking unit 202 can be configured to switch user communications from TDM connections to other TDM connections. The TDM to TDM switching functionality can be a sole configuration or a joint configuration with the TDM to ATM interworking functionality. The interworking unit 202 can be identified as a communication device.

The ATM matrix 204 is a controllable ATM matrix that establishes connections in response to control messages received from the signaling processor 106. The ATM matrix 204 is able to interwork between ATM connections and TDM connections. The ATM matrix 204 also switches ATM connections with other ATM connections. In addition, the ATM matrix 204 can switch calls from TDM connections to other TDM connections. The ATM matrix 204 transmits and receives call signaling and user communications over the connections. The ATM matrix 204 can be identified as a communication device.

The communication devices 206–212 are the same as the communication devices 112–116 of FIG. 1. Although, the communication devices 206 and 208 have links associated with the signaling processor 106. These links need not be direct. The illustrated links are exemplary.

The system of FIG. 2 operates similar to the system of FIG. 1. However, in the system of FIG. 2, the connection system 108 makes connections for TDM to ATM interworking, for ATM to ATM switching, and also for TDM to TDM switching. Therefore, the signaling processor 106 of FIG. 2 transmits control messages to the interworking unit 202 and the ATM matrix 204 identifying the selected connections.

In a first example, the communication device 206 transmits call signaling to the signaling processor 106. The communication device 206 also transports user communications to the interworking unit 202.

The signaling processor 106 processes the call signaling with routing logic and determines that the dialed number is a member of a portable NPA-NXX. A PNP is not present in the call signaling. In this example, the PNP is the FCI parameter, which is set to "not translated".

The signaling processor 106 transmits to the PNDB 110 a query with the dialed number. The response from the PNDB 110 will contain either an LRN if the called number is ported or the dialed digits if the called number is not ported. The PNDB 110 analyzes the query, determines that the dialed number is ported, and responds to the signaling processor 106 with the LRN for the call. In this example, the response from the PNDB 110 contains an LRN for the communication device 210, which is a recipient switch for this call.

The LRN is used by the signaling processor 106 to determine a route for the call and to determine new call signaling. The signaling processor 106 appends a 1 to the seven bit NOA to make the parameter an eight bit number. The signaling processor 106 processes the call signaling with routing logic and routing tables to determine the route and the new call signaling using the appended NOA. Because the NOA was appended, the call signaling is partitioned and processed as a ported number with logic and tables specific to ported number processing. Therefore, the translations in the routing tables can more quickly and easily process the called number as a ported number.

After the signaling processor 106 processes the call signaling with the routing logic and the routing tables, the appended 1 is removed from the NOA, thereby making the NOA a seven bit number. At this point the parameters for the new call signaling have been determined and the route for the call has been determined.

The signaling processor 106 creates the new call signaling and transmits the new call signaling to the communication device 210 via a link. In this example, the signaling processor adds a ported number GAP which contains the dialed number, places the LRN in the CdPN parameter, and sets the FCI bit to "translated".

In addition, the signaling processor 106 transmits a control message to the interworking unit 202 identifying the selected connection 216 over which to interwork the user communications. The signaling processor 106 also transmits a control message to the ATM matrix identifying the selected connection 218 over which to switch the user communications The interworking unit 202 receives the user communications from the communication device 206 and the control message from the signaling processor 106. In response to the control message, the interworking unit 202 interworks the user communications to the connection 216 selected by the signaling processor 106. In this example, the selected connection is a virtual path/virtual channel (VP/VC) on the connection 216.

The ATM matrix 204 receives the user communications over the connection 216 and the control message from the signaling processor 106. In response to the control message, the ATM matrix connects the user communications to the connection 218 selected by the signaling processor 106. In this example, the selected connection is a VP/VC on the connection 218.

In another example, the communication device 208 transmits call signaling to the signaling processor 106. The communication device 208 transmits user communications to the ATM matrix 204.

The signaling processor 106 processes the call signaling with routing logic and determines that the dialed number is not assigned to a portable NPA-NXX. A PNP is present in the call signaling. In this example, the PNP is the FCI parameter, which is set to "translated". In addition, a ported number GAP is not present in the call signaling. Thus, the call signaling indicates that a prior switch or other call processor has queried a PNDB and determined that the dialed number is not ported.

The signaling processor 106 uses the dialed number digits in the CdPN to determine a route for the call and to determine new call signaling. The signaling processor 106 does not append a 1 to the seven bit NOA. The signaling processor 106 processes the call signaling with routing logic and routing tables for non-ported numbers to determine the route and the new call signaling using the original un-appended NOA. Because the NOA was not appended, the call signaling is partitioned and processed as a non-ported number. This means that the translations in the routing tables can more quickly and easily process the called number as a non-ported number.

The signaling processor 106 processes the call signaling with the routing logic and the routing tables to determine the call is destined for the communication device 210. Since the NOA was not appended with a 1, there is nothing to remove. The NOA remains a seven bit number. At this point the parameters for the new call signaling have been determined and the route for the call has been determined.

The signaling processor 106 creates the new call signaling and transmits the new call signaling to the communication device 210 via a link. In this example, the new call signaling does not contain a ported number GAP, and the FCI parameter is set to "translated". In addition, the signaling processor 106 transmits a control message to the ATM matrix 204 identifying the selected connection 218 over which the user communications are to be connected.

The ATM matrix 204 receives the user communications from the communication device 208 and the control message from the signaling processor 106. In response to the control message, the ATM matrix 204 connects the user communications over the selected connection 218.

In this example, the selected connection is a VP/VC on the connection 218, and the user communications are received over a VP/VC on the connection 220. In this example, the communication devices 208 and 210 are ATM switches.

In still another example, the communication device 208 is an ATM gateway. The communication device 208 transmits user communications to the ATM matrix 204. Call signaling is received by the signaling processor 106.

The signaling processor 106 processes the call signaling with routing logic and determines that the dialed number is a member of a portable NPA-NXX. A PNP is present in the call signaling. In this example, the FCI parameter is set to "translated", and a ported number GAP is present.

The signaling processor 106 uses the LRN that is in the CdPN parameter to determine a route for the call and to determine new call signaling. The signaling processor 106 appends a 1 to the seven bit NOA to make the parameter an eight bit number. The signaling processor 106 then processes the call signaling with routing logic and routing tables to determine the route and the new call signaling using the appended NOA. Because the NOA was appended, the call signaling is partitioned and processed as a ported number with logic and tables specific to ported number processing. Therefore, the translations in the routing tables can more quickly and easily process the called number as a ported number.

After the signaling processor 106 processes the call signaling with the routing logic and the routing tables, the appended 1 is removed from the NOA, thereby making the NOA a seven bit number. At this point the parameters for the new call signaling have been determined and the route for the call has been determined.

The signaling processor 106 creates the new call signaling and transmits the new call signaling to the communication device 206 via a link. In this example, the signaling processor 106 adds a ported number GAP which contains the dialed number, places the LRN in the CdPN parameter, and sets the FCI bit to "translated".

In addition, the signaling processor 106 transmits a control message to the interworking unit 202 identifying the selected connection 214 over which to interwork the user communications. The signaling processor 106 also transmits a control message to the ATM matrix 204 identifying the selected connection 216 over which to switch the user communications The ATM matrix 204 receives the user communications over the connection 220 and the control message from the signaling processor 106. In response to the control message, the ATM matrix 204 connects the user communications to the connection 216 selected by the signaling processor 106. In this example, the selected connection is a VP/VC on the connection 216.

The interworking unit 202 receives the user communications over the connection 216 and the control message from the signaling processor 106. In response to the control message, the interworking unit 202 interworks the user communications to the connection 214 selected by the signaling processor 106. In this example, the selected connection is a DS0 on the connection 214.

The communication device 206 receives the new call signaling over the link and receives the user communications over the connection 214. In this example, the communication device 206 is a TDM switch.

In another example, the communication device 206 transmits call signaling to the signaling processor 106. The communication device 208 transmits user communications to the interworking unit 202.

In this example, the communication devices 206 and 212 are TDM switches. In this example, the interworking unit 202 provides TDM switching capability. It will be appreciated that a device providing only TDM switching may be used in this example in place of the interworking unit 202.

The signaling processor 106 processes the call signaling with routing logic and determines that the dialed number is not assigned to a portable NPA-NXX. In addition, a PNP is not present in the call signaling. In this example, the FCI parameter is set to "not translated", and a ported number GAP is not present in the call signaling.

The signaling processor 106 uses the dialed number digits in the CdPN to determine a route for the call and to determine new call signaling. The signaling processor 106 does not append a 1 to the seven bit NOA. The signaling processor 106 processes the call signaling with routing logic and routing tables for non-ported numbers to determine the route and the new call signaling using the original un-appended NOA. Because the NOA was not appended, the call signaling is partitioned and processed as a non-ported number. This means that the translations in the routing tables can more quickly and easily process the called number as a non-ported number.

The signaling processor 106 processes the call signaling with the routing logic and the routing tables. Since the NOA was not appended with a 1, there is nothing to remove. The NOA remains a seven bit number. At this point the parameters for the new call signaling have been determined and the route for the call has been determined.

The signaling processor 106 creates the new call signaling and transmits the new call signaling to the communication device 212 via a link. In this example, the new call signaling does not contain a ported number GAP, and the FCI parameter is set to "not translated". In addition, the signaling processor 106 transmits a control message to the interworking unit 202 identifying the selected connection 222 over which the user communications are to be connected.

The interworking unit 202 receives the user communications from the communication device 206 and the control message from the signaling processor 106. In response to the control message, the interworking unit 202 connects the user communications over the selected connection 222. In this example, the connection 214 is a DS0, and the selected connection is a DS0 on the connection 222. Thus, the interworking unit 202 provides TDM switching.

The Controllable ATM Matrix

Figure 3:
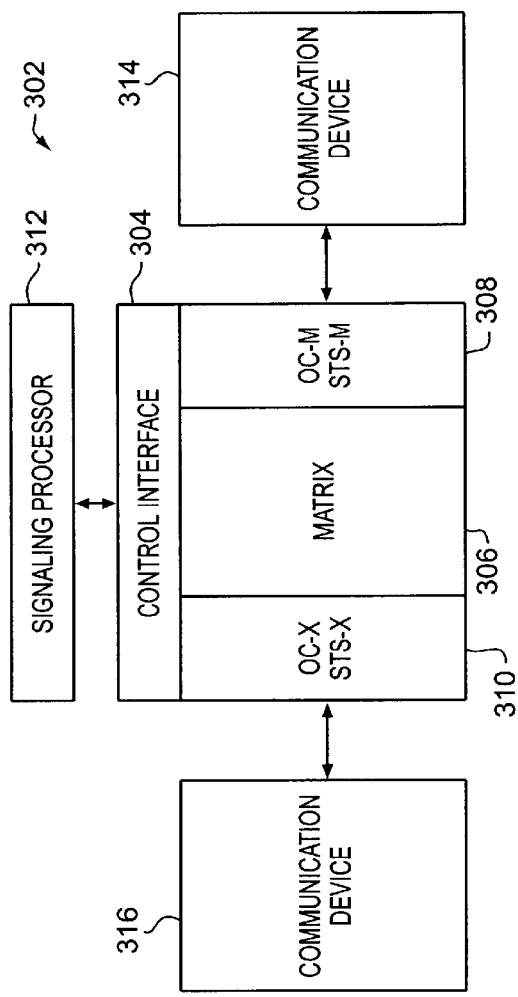
FIG. 3 is a functional diagram of a controllable asynchronous transfer mode matrix in accordance with the present invention.

FIG. 3 illustrates an exemplary embodiment of a controllable asynchronous transfer mode (ATM) matrix (CAM), but other CAMs that support the requirements of the invention also are applicable. The CAM 302 may receive and transmit ATM formatted user communications or call signaling.

The CAM 302 preferably has a control interface 304, a controllable ATM matrix 306, an optical carrier-M/synchronous transport signal-M (OC-M/STS-M) interface 308, and an OC-X/STS-X interface 310. As used herein in conjunction with OC or STS, "M" refers to an integer, and "X" refers to an integer.

The control interface 304 receives control messages originating from the signaling processor 312, identifies virtual connection assignments in the control messages, and provides these assignments to the matrix 306 for implementation. The control messages may be received over an ATM virtual connection and through either the OC-M/STS-M interface 308 or the OC-X/STS-X interface 310 through the matrix 306 to the control interface 304, through either the OC-M/STS-M interface or the OC-X/STS-X interface directly to the control interface, or through the control interface from a link.

The matrix 306 is a controllable ATM matrix that provides cross connect functionality in response to control messages from the signaling processor 312. The matrix 306 has access to virtual path/virtual channels (VP/VCs) over which it can connect calls. For example, a call can come in over a VP/VC through the OC-M/STS-M interface 308 and be connected through the matrix 306 over a VP/VC through the OC-X/STS-X interface 310 in response to a control message received by the signaling processor 312 through the control interface 304. Alternately, a call can be connected in the opposite direction. In addition, the call can be received over a VP/VC through the OC-M/STS-M interface 308 or the OC-X/STS-X interface 310 and be connected through the matrix 306 to a different VP/VC on the same OC-M/STS-M interface or the same OC-X/STS-X interface.

The OC-M/STS-M interface 308 is operational to receive ATM cells from the matrix 306 and to transmit the ATM cells over a connection to the communication device 314. The OC-M/STS-M interface 308 also may receive ATM cells in the OC or STS format and transmit them to the matrix 306.

The OC-X/STS-X interface 310 is operational to receive ATM cells from the matrix 306 and to transmit the ATM cells over a connection to the communication device 316.

The OC-X/STS-X interface 310 also may receive ATM cells in the OC or STS format and transmit them to the matrix 306.

Call signaling may be received through and transferred from the OC-M/STS-M interface 308. Also, call signaling may be received through and transferred from the OC-X/STS-M interface 310. The call signaling may be connected on a connection or transmitted to the control interface directly or via the matrix 306.

The signaling processor 312 is configured to send control messages to the CAM 302 to implement particular features on particular VP/VC circuits. Alternatively, lookup tables may be used to implement particular features for particular VP/VCs.

Figure 4:
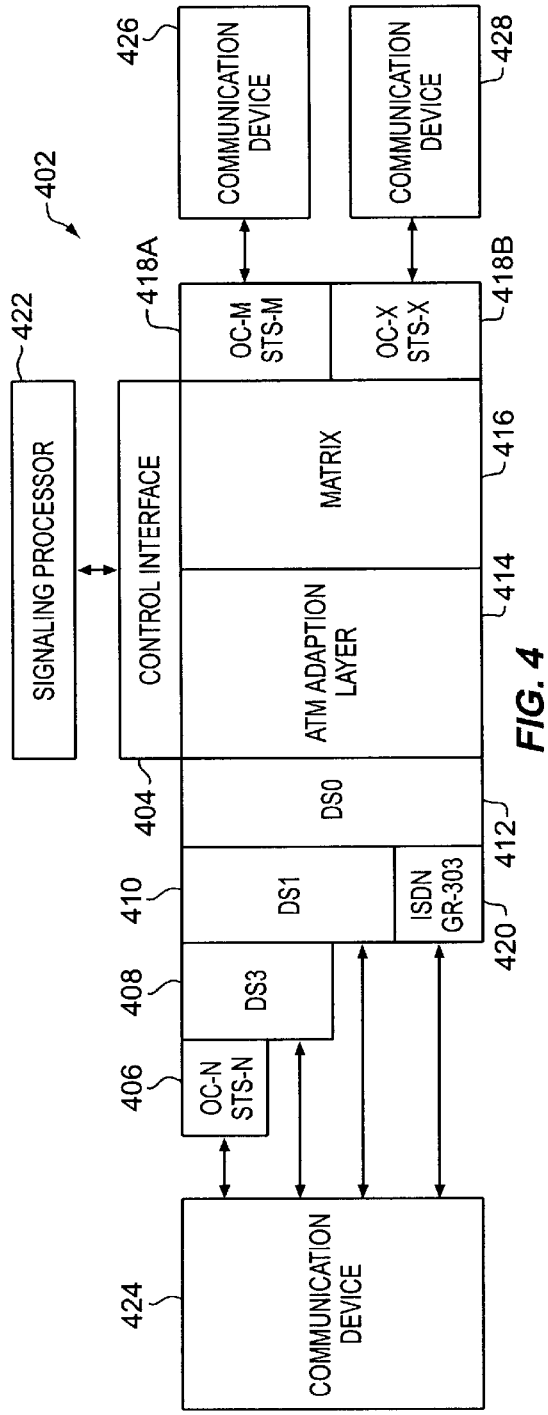
FIG. 4 is a functional diagram of a controllable asynchronous transfer mode matrix with time division multiplex capability in accordance with the present invention.

FIG. 4 illustrates another exemplary embodiment of a CAM which has time division multiplex (TDM) capability, but other CAMs that support the requirements of the invention also are applicable. The CAM 402 may receive and transmit in-band and out-of-band signaled calls.

The CAM 402 preferably has a control interface 404, an OC-N/STS-N interface 406, a digital signal level 3 (DS3) interface 408, a DS1 interface 410, a DS0 interface 412, an ATM adaptation layer (AAL) 414, a controllable ATM matrix 416, an OC-M/STS-M interface 418A, an OC-X/STS-X interface 418B, and an ISDN/GR-303 interface 420. As used herein in conjunction with OC or STS, "N" refers to an integer, "M" refers to an integer, and "X" refers to an integer.

The control interface 404 receives control messages originating from the signaling processor 422, identifies DS0 and virtual connection assignments in the control messages, and provides these assignments to the AAL 414 or the matrix 416 for implementation. The control messages may be received over an ATM virtual connection and through the OC-M/STS-M interface 418A to the control interface 404, through the OC-X/STS-X interface 418B and the matrix 416 to the control interface, or directly through the control interface from a link.

The OC-N/STS-N interface 406, the DS3 interface 408, the DS1 interface 410, the DS0 interface 412, and the ISDN/GR-303 interface 420 each can receive user communications from a communication device 424. Likewise, the OC-M/STS-M interface 418A and the OC-X/STS-X interface 418B can receive user communications from the communication devices 426 and 428.

The OC-N/STS-N interface 406 receives OC-N formatted user communications and STS-N formatted user communications and converts the user communications to the DS3 format. The DS3 interface 408 receives user communications in the DS3 format and converts the user communications to the DS1 format. The DS3 interface 408 can receive DS3s from the OC-N/STS-N interface 406 or from an external connection. The DS1 interface 410 receives the user communications in the DS1 format and converts the user communications to the DS0 format. The DS1 interface 410 receives DS1s from the DS3 interface 408 or from an external connection. The DS0 interface 412 receives user communications in the DS0 format and provides an interface to the AAL 414. The ISDN/GR-303 interface 420 receives user communications in either the ISDN format or the GR-303 format and converts the user communications to the DS0 format. In addition, each interface may transmit user communications in like manner to the communication device 424.

The OC-M/STS-M interface 418A is operational to receive ATM cells from the AAL 414 or from the matrix 416 and to transmit the ATM cells over a connection to the communication device 426. The OC-M/STS-M interface 418A also may receive ATM cells in the OC or STS format and transmit them to the AAL 414 or to the matrix 416.

The OC-X/STS-X interface 418B is operational to receive ATM cells from the AAL 414 or from the matrix 416 and to transmit the ATM cells over a connection to the communication device 428. The OC-X/STS-X interface 418B also may receive ATM cells in the OC or STS format and transmit them to the AAL 414 or to the matrix 416.

Call signaling may be received through and transferred from the OC-N/STS-N interface 406 and the ISDN/GR-303 interface 420. Also, call signaling may be received through and transferred from the OC-M/STS-M interface 418A and the OC-X/STS-X interface 418B. The call signaling may be connected on a connection or transmitted to the control interface directly or via an interface as explained above.

The AAL 414 comprises both a convergence sublayer and a segmentation and reassembly (SAR) sublayer. The AAL 414 obtains the identity of the DS0 and the ATM VP/VC from the control interface 404. The AAL 414 is operational to convert between the DS0 format and the ATM format. AALs are known in the art, and information about AALs is provided by International Telecommunications Union (ITU) documents in the series of I.363, which are incorporated herein by reference. For example, ITU document I.363.1 discusses AAL1. An AAL for voice calls is described in U.S. Pat. No. 5,706,553 entitled "Cell Processing for Voice Transmission," which is incorporated herein by reference.

Calls with multiple 64 Kilo-bits per second (Kbps) DS0s are known as N×64 calls. If desired, the AAL 414 can be configured to accept control messages through the control interface 404 for N×64 calls. The CAM 402 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

The matrix 416 is a controllable ATM matrix that provides cross connect functionality in response to control messages from the signaling processor 422. The matrix 416 has access to VP/VCs over which it can connect calls. For example, a call can come in over a VP/VC through the OC-M/STS-M interface 418A and be connected through the matrix 416 over a VP/VC through the OC-X/STS-X interface 418B in response to a control message received by the signaling processor 422 through the control interface 404. Alternately, the matrix 416 may transmit a call received over a VP/VC through the OC-M/STS-M interface 418A to the AAL 414 in response to a control message received by the signaling processor 422 through the control interface 404. Communications also may occur in opposite directions through the various interfaces.

In some embodiments, it may be desirable to incorporate digital signal processing capabilities, for example, at the DS0 level. It also may be desired to apply echo control to selected DS0 circuits. In these embodiments, a signal processor may be included. The signaling processor 422 is configured to send control messages to the CAM 402 to implement particular features on particular DS0 or VP/VC circuits. Alternatively, lookup tables may be used to implement particular features for particular circuits or VP/VCs.

It will be appreciated from the teachings above for the CAMs and for the teachings below for the ATM interworking units, that the above described CAMs can be adapted for modification to transmit and receive other formatted communications such as synchronous transport module (STM) and European level (E) communications. For example, the OC/STS, DS3, DS1, DS0, and ISDN/GR-303 interfaces can be replaced by STM electrical/optical (E/O), E3, E1, E0, and digital private network signaling system (DPNSS) interfaces, respectively.

The ATM Interworking Unit

FIG. 5 illustrates an exemplary embodiment of an interworking unit which is an ATM interworking unit 502 suitable for the present invention for use with a SONET system. Other interworking units that support the requirements of the invention also are applicable. The ATM interworking unit 502 may receive and transmit in-band and out-of-band calls.

The ATM interworking unit 502 preferably has a control interface 504, an OC-N/STS-N interface 506, a DS3 interface 508, a DS1 interface 510, a DS0 interface 512, a signal processor 514, an AAL 516, an OC-M/STS-M interface 518, and an ISDN/GR-303 interface 520. As used herein in conjunction with OC or STS, "N" refers to an integer, and "M" refers to an integer.

The control interface 504 receives control messages originating from the signaling processor 522, identifies DS0 and virtual connection assignments in the control messages, and provides these assignments to the AAL 516 for implementation. The control messages are received over an ATM virtual connection and through the O-CM/STS-M interface 518 to the control interface 504 or directly through the control interface from a link.

The OC-N/STS-N interface 506, the DS3 interface 508, the DS1 interface 510, the DS0 interface 512, and the ISDN/GR-303 interface 520 each can receive user communications from a communication device 524. Likewise, the OC-M/STS-M interface 518 can receive user communications from a communication device 526.

The OC-N/STS-N interface 506 receives OC-N formatted user communications and STS-N formatted user communications and demultiplexes the user communications to the DS3 format. The DS3 interface 508 receives user communications in the DS3 format and demultiplexes the user communications to the DS1 format. The DS3 interface 508 can receive DS3s from the OC-N/STS-N interface 506 or from an external connection. The DS1 interface 510 receives the user communications in the DS1 format and demultiplexes the user communications to the DS0 format. The DS1 interface 510 receives DS1s from the DS3 interface 508 or from an external connection. The DS0 interface 512 receives user communications in the DS0 format and provides an interface to the AAL 516. The ISDN/GR-303 interface 520 receives user communications in either the ISDN format or the GR-303 format and converts the user communications to the DS0 format. In addition, each interface may transmit user communications in like manner to the communication device 524.

The OC-M/STS-M interface 518 is operational to receive ATM cells from the AAL 516 and to transmit the ATM cells over the connection to the communication device 526. The OC-M/STS-M interface 518 also may receive ATM cells in the OC or STS format and transmit them to the AAL 516.

Call signaling may be received through and transferred from the OC-N/STS-N interface 506 and the ISDN/GR-303 interface 520. Also, call signaling may be received through and transferred from the OC-M/STS-M interface 518. The call signaling may be connected on a connection or transmitted to the control interface directly or via another interface as explained above.

The AAL 516 comprises both a convergence sublayer and a segmentation and reassembly (SAR) sublayer. The AAL 516 obtains the identity of the DS0 and the ATM VP/VC from the control interface 504. The AAL 516 is operational to convert between the DS0 format and the ATM format.

If desired, the AAL 516 can be configured to accept control messages through the control interface 504 for N×64 calls. The ATM interworking unit 502 is able to interwork, multiplex, and demultiplex for multiple DS0s.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo control to selected DS0 circuits. In these embodiments, a signal processor 514 is included either separately (as shown) or as a part of the DS0 interface 512. The signaling processor 522 is configured to send control messages to the ATM interworking unit 502 to implement particular features on particular DS0 circuits. Alternatively, lookup tables may be used to implement particular features for particular circuits or VP/VCs.

FIG. 6 illustrates another exemplary embodiment of an interworking unit which is an ATM interworking unit 602 suitable for the present invention for use with an SDH system. The ATM interworking unit 602 preferably has a control interface 604, an STM-N electrical/optical (E/O) interface 606, an E3 interface 608, an E1 interface 610, an E0 interface 612, a signal processor 614, an AAL 616, an STM-M electrical/optical (E/O) interface 618, and a DPNSS interface 620. As used herein in conjunction with STM, "N" refers to an integer, and "M" refers to an integer.

The control interface 604 receives control messages from the signaling processor 622, identifies E0 and virtual connection assignments in the control messages, and provides these assignments to the AAL 616 for implementation. The control messages are received over an ATM virtual connection and through the STM-M interface 618 to the control interface 504 or directly through the control interface from a link.

The STM-N E/O interface 606, the E3 interface 608, the E1 interface 610, the E0 interface 612, and the DPNSS interface 620 each can receive user communications from a second communication device 624. Likewise, the STM-M E/O interface 618 can receive user communications from a third communication device 626.

The STM-N E/O interface 606 receives STM-N electrical or optical formatted user communications and converts the user communications from the STM-N electrical or STM-N optical format to the E3 format. The E3 interface 608 receives user communications in the E3 format and demultiplexes the user communications to the E1 format. The E3 interface 608 can receive E3s from the STM-N E/O interface 606 or from an external connection. The E1 interface 610 receives the user communications in the E1 format and demultiplexes the user communications to the E0 format. The E1 interface 610 receives E1s from the STM-N E/O interface 606 or the E3 interface 608 or from an external connection. The E0 interface 612 receives user communications in the E0 format and provides an interface to the AAL 616. The DPNSS interface 620 receives user communications in the DPNSS format and converts the user communications to the E0 format. In addition, each interface may transmit user communications in a like manner to the communication device 624.

The STM-M E/O interface 618 is operational to receive ATM cells from the AAL 616 and to transmit the ATM cells over the connection to the communication device 626. The STM-M E/O interface 618 may also receive ATM cells in the STM-M E/O format and transmit them to the AAL 616.

Call signaling may be received through and transferred from the STM-N E/O interface 606 and the DPNSS interface 620. Also, call signaling may be received through and transferred from the STM-M E/O interface 618. The call signaling may be connected on a connection or transmitted to the control interface directly or via another interface as explained above.

The AAL 616 comprises both a convergence sublayer and a segmentation and reassembly (SAR) sublayer. The AAL obtains the identity of the E0 and the ATM VP/VC from the control interface 604. The AAL 616 is operational to convert between the E0 format and the ATM format, either in response to a control instruction or without a control instruction. AAL's are known in the art. If desired, the AAL 616 can be configured to receive control messages through the control interface 604 for N×64 user communications.

E0 connections are bi-directional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo control. In these embodiments, a signal processor 614 is included either separately (as shown) or as a part of the E0 interface 612. The signaling processor 622 is configured to send control messages to the ATM interworking unit 602 to implement particular features on particular circuits. Alternatively, lookup tables may be used to implement particular features for particular circuits or VP/VCs.

The Signaling Processor

The signaling processor receives and processes telecommunications call signaling, control messages, and customer data to select connections that establish communication paths for calls. In the preferred embodiment, the signaling processor processes SS7 signaling to select connections for a call. An example of call processing in a call processor and the associated maintenance that is performed for call processing is described in a U.S. Patent Application entitled "System and Method for Processing a Call," filed on Nov. 5, 1999, and assigned to the same entity as this application, which is incorporated herein by reference.

In addition to selecting connections, the signaling processor performs many other functions in the context of call processing. It not only can control routing and select the actual connections, but it also can validate callers, control echo cancellers, generate accounting information, invoke intelligent network functions, access remote databases, manage traffic, and balance network loads. One skilled in the art will appreciate how the signaling processor described below can be adapted to operate in the above embodiments.

Figure 7:
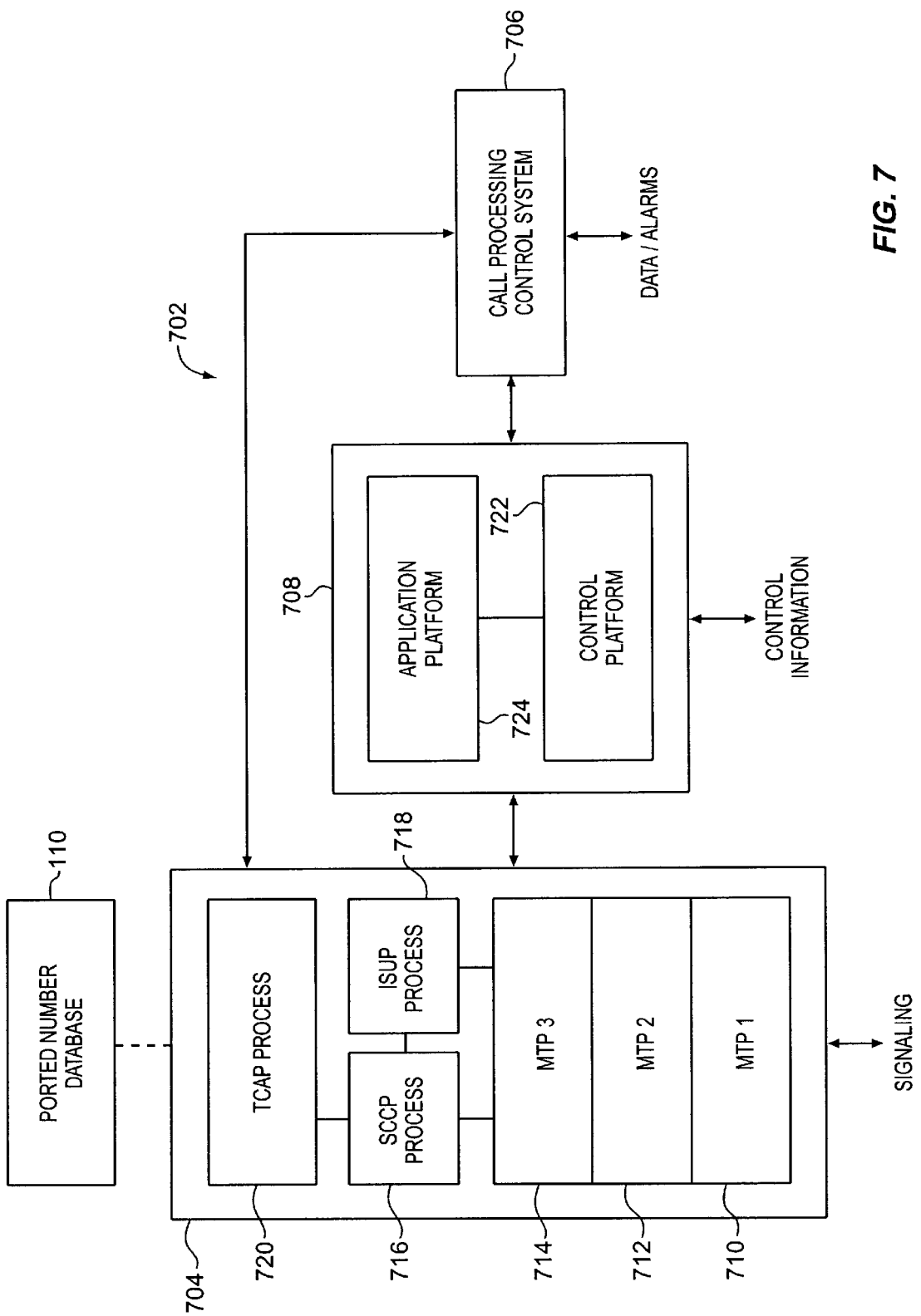
FIG. 7 is a block diagram of a signaling processor constructed in accordance with the present system.

FIG. 7 depicts an embodiment of a signaling processor. Other versions also are contemplated. In the embodiment of FIG. 7, the signaling processor 702 has a signaling interface 704, a call processing control system 706 (CPCS), and a call processor 708. It will be appreciated that the signaling processor 702 may be constructed as modules in a single unit or as multiple units.

The signaling interface 704 is coupled externally to signaling systems—preferably to signaling systems having a message transfer part (MTP), an ISDN user part (ISUP), a signaling connection control part (SCCP), an intelligent network application part (INAP), and a transaction capabilities application part (TCAP). The signaling interface 704 preferably is a platform that comprises an MTP level 1 710, an MTP level 2 712, an MTP level 3 714, an SCCP process 716, an ISUP process 718, and a TCAP process 720. The signaling interface 704 also has INAP functionality.

The signaling interface 704 may be linked to a communication device (not shown). For example, the communication device may be an SCP which is queried by the signaling interface with a TCAP query to obtain additional call-associated data. The answer message may have additional information parameters that are required to complete call processing. The communication device also may be an STP or other device.

The signaling interface 704 is operational to transmit, process, and receive call signaling. The TCAP, SCCP, ISUP, and INAP functionality use the services of the MTP to transmit and receive the messages. Preferably, the signaling interface 704 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 704 process information that is received in message signal units (MSUs) and convert the information to call information elements that are sent to the call processor 708 to be processed. A call information element may be, for example, an ISUP IAM message parameter from the MSU. The signaling interface 704 strips the unneeded header information from the MSU to isolate the message information parameters and passes the parameters to the call processor 708 as the call information elements. Examples of these parameters are the called number, the calling number, and user service information. Other examples of messages with information elements are an ANM, an ACM, an REL, an RLC, and an INF. In addition, call information elements are transferred from the call processor 708 back to the signaling interface 704, and the information elements are reassembled into MSUs and transferred to a signaling point.

The CPCS 706 is a management and administration system. The CPCS 706 is the user interface and external systems interface into the call processor 708. The CPCS 706 serves as a collection point for call-associated data such as logs, operational measurement data, statistical information, accounting information, and other call data. The CPCS 706 can configure the call-associated data and/or transmit it to reporting centers.

The CPCS 706 accepts data, such as the translations, from a source such as an operations system and updates the data in the tables in the call processor 708. The CPCS 706 ensures that this data is in the correct format prior to transferring the data to the call processor 708. The CPCS 706 also provides configuration data to other devices including the call processor 708, the signaling interface 704, the interworking unit (not shown), and the controllable ATM matrix (not shown). In addition, the CPCS 706 provides for remote control of call monitoring and call tapping applications from the call processor 708.

The CPCS 706 also serves as a collection point for alarms. Alarm information is transferred to the CPCS 706. The CPCS 706 then transports alarm messages to the required communication device. For example, the CPCS 706 can transport alarms to an operations center.

The CPCS 706 also has a human-machine interface (HMI). This allows a person to log onto the CPCS 706 and manage data tables or review data tables in the CPCS or provide maintenance services.

The call processor 708 processes call signaling and controls an ATM interworking unit, such as an ATM interworking multiplexer (mux) that performs interworking of DS0s and VP/VCs, and an ATM matrix. However, the call processor 708 may control other communications devices and connections in other embodiments.

The call processor 708 comprises a control platform 722 and an application platform 724. Each platform 722 and 724 is coupled to the other platform.

The control platform 722 is comprised of various external interfaces including an interworking unit interface, a controllable ATM matrix, an echo interface, a resource control interface, a call information interface, and an operations interface. The control platform 722 is externally coupled to an interworking unit control, a controllable ATM matrix control, an echo control, a resource control, accounting, and operations. The interworking unit interface exchanges messages with at least one interworking unit. These messages comprise DS0 to VP/VC assignments, acknowledgments, and status information. The controllable ATM matrix interface exchanges messages with at least one controllable ATM matrix. These messages comprise DS0 to VP/VC assignments, VP/VC to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 706. Typical call information includes accounting information, such as the parties to the call, time points for the call, and any special features applied to the call. One skilled in the art will appreciate how to produce the software for the interfaces in the control platform 722.

The application platform 724 processes signaling information from the signaling interface 704 to select connections. The identity of the selected connections are provided to the control platform 722 for the interworking unit interface and/or for the controllable ATM matrix interface. The application platform 724 is responsible for validation, translation, routing, call control, exceptions, screening, and error handling. In addition to providing the control requirements for the interworking unit and the controllable ATM matrix, the application platform 724 also provides requirements for echo control and resource control to the appropriate interface of the control platform 722. In addition, the application platform 724 generates signaling information for transmission by the signaling interface 704. The signaling information might be for ISUP, INAP, or TCAP messages to external network elements. Pertinent information for each call is stored in an enhanced circuit data block (ECDB) for the call. The ECDB can be used for tracking and accounting the call.

The application platform 724 preferably operates in general accord with the Basic Call State Model (BCSM) defined by the ITU. An instance of the BCSM is created to handle each call. The BCSM includes an originating process and a terminating process. The application platform 724 includes a service switching function (SSF) that is used to invoke the service control function (SCF). Typically, the SCF is contained in an SCP. The SCF is queried with TCAP or INAP messages that are transported by the signaling interface 704 and which are initiated with information from the SSF in the application platform 724. The originating or terminating processes will access remote databases with intelligent network (IN) functionality via the SSF.

Software requirements for the application platform 724 can be produced in specification and description language (SDL) defined in ITU-T Z.100 or similar logic or description languages. The SDL can be converted into C code. A real time case tool such as SDT from Telelogic, Inc. or Object Time from Object Time, Inc. can be used. Additional C and C++ code can be added as required to establish the environment. It will be appreciated that other software languages and tools may be used.

The call processor 708 can be comprised of the above-described software loaded onto a computer. The computer can be a generally available fault-tolerant Unix computer, such as those provided by Sun, Tandem, or Hewlett Packard. It may be desirable to utilize the multi-threading capability of a Unix operating system.

From FIG. 7, it can be seen that the application platform 724 processes signaling information to control numerous systems and facilitate call connections and services. The SS7 signaling is exchanged between the call processor 708 and external components through the signaling interface 704, and control information is exchanged with external systems through the control platform 722. Advantageously, the signaling interface 704, the CPCS 706, and the call processor 708 are not integrated into a switch central processing unit (CPU) that is coupled to a switching matrix. Unlike an SCP, the components of the signaling processor 702 are capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address Message
LPA—Loop Back Acknowledgment
PAM—Pass Along Message
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 8:
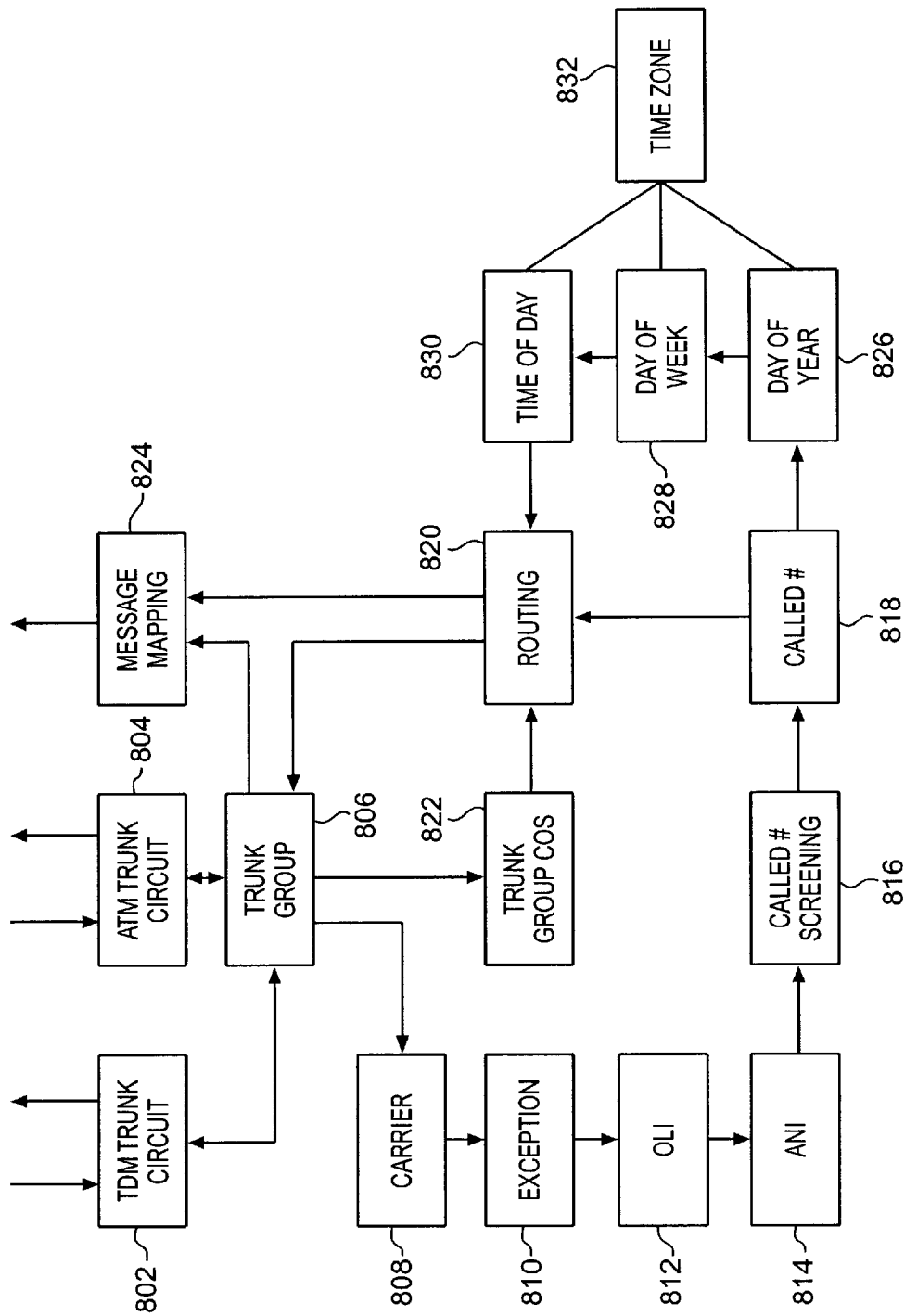
FIG. 8 is a block diagram of a data structure having tables that are used in the signaling processor of FIG. 7.

FIG. 8 depicts an exemplary data structure preferably used by the call processor 702 of FIG. 7 to execute the BCSM. This is accomplished through a series of tables that point to one another in various ways. The pointers typically are comprised of next function and next label designations. The next function points to the next table, and the next label points to an entry or a range of entries in that table. It will be appreciated that the pointers for the main call processing are illustrated in FIG. 8.

The primary data structure has a TDM trunk circuit table 802, an ATM trunk circuit table 804, a trunk group table 806, a carrier table 808, an exception table 810, an originating line information (OLI) table 812, an automatic number identification (ANI) table 814, a called number screening table 816, a called number table 818, a routing table 820, a trunk group class of service (COS) table 822, and a message mapping table 824. Also included in the data structure are a day of year table 826, a day of week table 828, a time of day table 830, and a time zone table 832.

The TDM trunk circuit table 802 contains information required to provision the TDM side of a connection from the call processor site. Each circuit on the TDM side of a connection has an entry. The TDM trunk circuit table 802 is accessed from the trunk group table 806 or an external call process, and it points to the trunk group table.

The ATM trunk circuit table 804 contains information required to provision the ATM side of a connection. Typically, one record appears in this table per ATM trunk group. Although, the system can be configured alternately for multiple records per trunk group. The ATM trunk circuit table 804 is accessed from the trunk group table 806 or an external call process, and it points to the trunk group table.

The trunk group table 806 contains information that is required to build trunk groups out of different trunk members identified in the TDM and ATM trunk circuit tables 802 and 804. The trunk group table 806 contains information related to the originating and terminating trunk groups. The trunk group table 806 typically points to the carrier table 808. Although, the trunk group table 806 may point to the exception table 810, the OLI table 812, the ANI table 814, the called number screening table 816, the called number table 818, the routing table 820, the day of year table 826, the day of week table 828, the time of day table 830, and the treatment table (see FIG. 9).

For default processing of an IAM of an outgoing call in the forward direction, when the call process determines call setup and routing parameters for user communications on the originating portion, the trunk group table 806 is the next table after the TDM and ATM trunk circuit tables 802 and 804, and the trunk group table points to the carrier table 808. For default processing of an IAM of an outgoing call in the forward direction, when the call process determines call setup and routing parameters for user communications on the terminating portion, the trunk group table 806 is the next table after the routing table 820, and the trunk group table points to the TDM or ATM trunk circuit table 802 or 804. For default processing of an ACM or an ANM of an outgoing call in the originating direction, when the call process determines parameters for signaling, the trunk group table 806 is the next table after the TDM or ATM trunk circuit table 802 or 804, and the trunk group table points to the message mapping table 824. It will be appreciated that this is the default method, and, as explained herein, other implementations of table processing occur.

The carrier table 808 contains information that allows calls to be screened based, at least in part, on the carrier information parameter and the carrier selection parameter. The carrier table 808 typically points to the exception table 810. Although, the carrier table 808 may point to the OLI table 812, the ANI table 814, the called number screening table 816, the called number table 818, the routing table 820, the day of year table 826, the day of week table 828, the time of day table 830, the treatment table (see FIG. 9), and the database services table (see FIG. 11).

The exception table 810 is used to identify various exception conditions related to the call that may influence the routing or handling of the call. The exception table 810 contains information that allows calls to be screened based, at least in part, on the called party number and the calling party's category. The exception table 810 typically points to the OLI table 812. Although, the exception table 810 can point to the ANI table 814, the called number screening table 816, the called number table 818, the routing table 820, the day of year table 826, the day of week table 828, the time of day table 830, the call rate table, the percent control table, the treatment table (see FIG. 9), and the database services table (see FIG. 11).

The OLI table 812 contains information that allows calls to be screened based, at least in part, on originating line information in an IAM. The OLI table 812 typically points to the ANI table 814. Although, the OLI table can point to the called number screening table 816, the called number table 818, the routing table 820, the day of year table 826, the day of week table 828, the time of day table 830, and the treatment table (see FIG. 9).

The ANI table 814 is used to identify any special characteristics related to the caller's number, which is commonly known as automatic number identification. The ANI table 814 is used to screen and validate an incoming ANI. ANI specific requirements such as queuing, echo cancellation, time zone, and treatments can be established. The ANI table 814 typically points to the called number screening table 816. Although, the ANI table 814 can point to the called number table 818, the routing table 820, the day of year table 826, the day of week table 828, the time of day table 830, and the treatment table (see FIG. 9).

The called number screening table 816 is used to screen called numbers. The called number screening table 816 determines the disposition of the called number and the nature of the called number. The called number screening table 816 is used to provide the trigger detection point (TDP) for an AIN SCP TCAP query. It is used, for example, with the local number portability (LNP) feature. The called number screening table can invoke a TCAP. The called number screening table 816 typically points to the called number table 818. Although, the called number screening table 816 can point to the routing table 820, the treatment table, the call rate table, the percent table (see FIG. 9), and the database services table (see FIG. 11).

The called number table 818 is used to identify routing requirements based on, for example, the called number. This will be the case for standard calls. The called number table 818 typically points to the routing table 810. In addition, the called number table 826 can be configured to alternately point to the day of year table 826. The called number table 818 can also point to the treatment table (see FIG. 9) and the database services table (see FIG. 11).

The routing table 820 contains information relating to the routing of a call for various connections. The routing table 820 typically points to the treatment table (see FIG. 9). Although, the routing table also can point to the trunk group table 806 and the database services table (see FIG. 11).

For default processing of an IAM of an outgoing call in the forward direction, when the call process determines call setup and routing parameters for user communications, the routing table 820 is the next table after the called number table 818, and the routing table points to the trunk group table 806. For default processing of an IAM of an outgoing call in the forward direction, when the call process determines parameters for signaling, the routing table 820 is the next table after the called number table 818, and the routing table points to the message mapping table 824. It will be appreciated that this is the default method, and, as explained herein, other implementations of table processing occur.

The trunk group COS table 822 contains information that allows calls to be routed differently based on the class of service assigned to the originating trunk group and to the terminating trunk group. The trunk group COS table can point to the routing table 820 or the treatment table (see FIG. 9).

When the trunk group COS table 822 is used in processing, after the routing table 820 and the trunk group table 806 are processed, the trunk group table points to the trunk group COS table. The trunk group COS table points back to the routing table 820 for further processing. Processing then continues with the routing table 820 which points to the trunk group table 806, and the trunk group table which points to the TDM or ATM trunk circuit table 802 or 804. It will be appreciated that this is the default method, and, as explained herein, other implementations of table processing occur.

The message mapping table 824 is used to provide instructions for the formatting of signaling messages from the call processor. It typically can be accessed by the routing table 820 or the trunk group table 806 and typically determines the format of the outgoing messages leaving the call processor.

The day of year table 826 contains information that allows calls to be routed differently based on the day of the year.

The day of year table typically points to the routing table 820 and references the time zone table 832 for information. The day of year table 826 also can point to the called number screening table 816, the called number table 818, the routing table 820, the day of week table 828, the time of day table 830, and the treatment table (see FIG. 9).

The day of week table 828 contains information that allows calls to be routed differently based on the day of the week. The day of week table typically points to the routing table 820 and references the time zone table 832 for information. The day of week table 828 also can point to the called number screening table 816, the called number table 818, the time of day table 830, and the treatment table (see FIG. 9).

The time of day table 830 contains information that allows calls to be routed differently based on the time of the day. The time of day table 830 typically points to the routing table 820 and references the time zone table 832 for information. The time of day table 830 also can point to the called number screening table 816, the called number table 818, and the treatment table (see FIG. 9).

The time zone table 832 contains information that allows call processing to determine if the time associated with the call processing should be offset based on the time zone or daylight savings time. The time zone table 832 is referenced by, and provides information to, the day of year table 826, the day of week table 828, and the time of day table 830.

Figure 9:
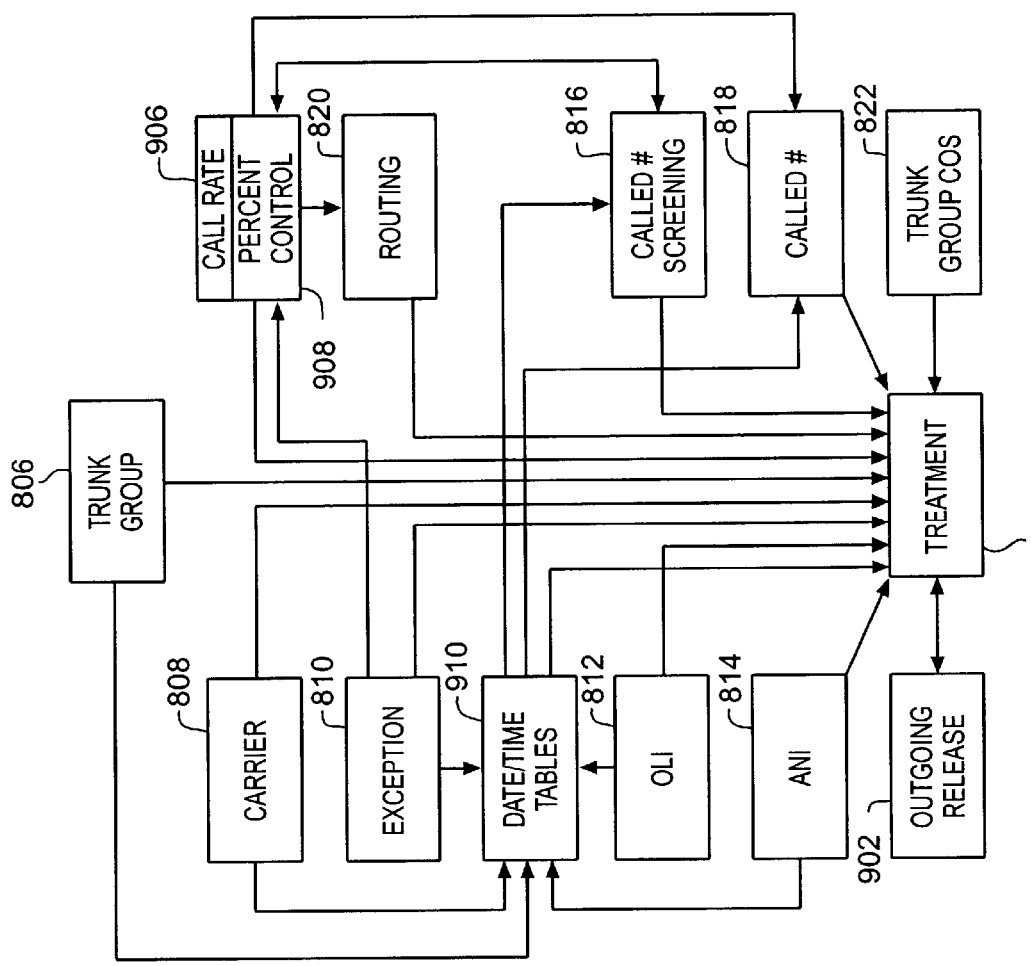
FIG. 9 is a block diagram of additional tables that are used in the signaling processor of FIG. 8.

FIG. 9 is an overlay of FIG. 8. The tables from FIG. 8 are present. However, for clarity, the table's pointers have been omitted, and some tables have not been duplicated in FIG. 9. FIG. 9 illustrates additional tables that can be accessed from the tables of FIG. 8. These include an outgoing release table 902, a treatment table 904, a call rate table 906, and a percent control table 908, and time/date tables 910.

The outgoing release table 902 contains information that allows call processing to determine how an outgoing release message is to be formatted. The outgoing release table 902 typically points to the treatment table 906.

The treatment table 904 identifies various special actions to be taken in the course of call processing. For example, based on the incoming trunk group or ANI, different treatments or cause codes are used to convey problems to the called and calling parties. This typically will result in the transmission of a release message (REL) and a cause value. The treatment table 904 typically points to the outgoing release table 902 and the database services table (see FIG. 10).

The call rate table 906 contains information that is used to control call attempts on an attempt per second basis. Preferably, attempts from 100 per second to 1 per minute are programmable. The call rate table 906 typically points to the called number screening table 816, the called number table 818, the routing table 820, and the treatment table 904.

The percent control table 908 contains information that is used to control call attempts based upon a percent value of the traffic that is processed through call processing. The percent control table 908 typically points to the called number screening table 816, the called number table 818, the routing table 820, and the treatment table 904.

The date/time tables 910 have been identified in FIG. 8 as the day of year table 826, the day of week table 828, the time of day table 826, and the time zone table 832. They are illustrated in FIG. 9 as a single location for ease and clarity but need not be so located.

Figure 10:
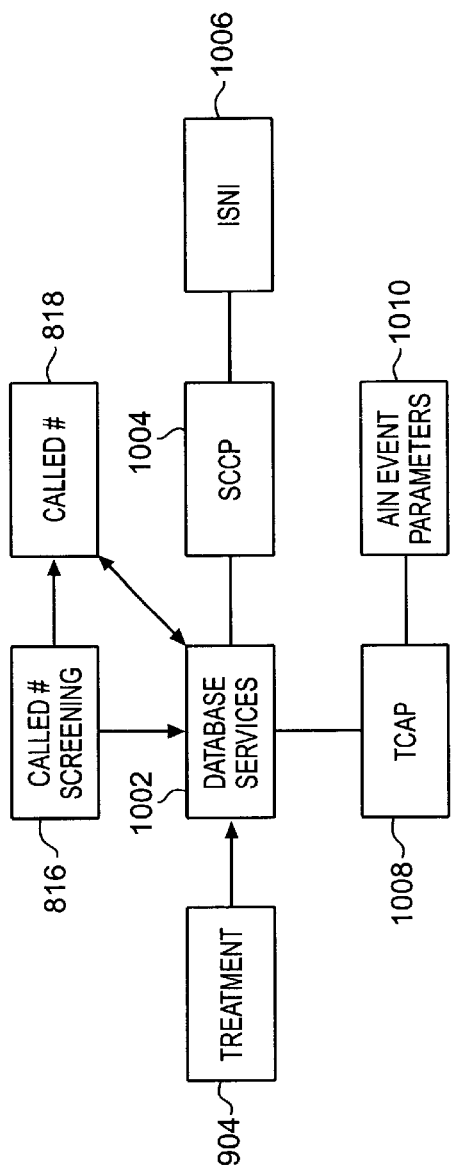
FIG. 10 is a block diagram of additional tables that are used in the signaling processor of FIG. 8.

FIG. 10 is an overlay of FIGS. 8–9. The tables from FIGS. 8–9 are present. However, for clarity, the table's pointers have been omitted, and some tables have not been duplicated in FIG. 10.

FIG. 10 illustrates additional tables that can be accessed from the tables of FIGS. 8–9 and which are directed to the TCAP and the SCCP message processes. These include a database services table 1002, a signaling connection control part (SCCP) table 1004, an intermediate signaling network identification (ISNI) table 1006, a transaction capabilities application part (TCAP) table 1008, and an advanced intelligent network (AIN) event parameters table 1010.

The database services table 1002 contains information about the type of database service requested by call processing. The database services table 1002 references and obtains information from the SCCP table 1004 and the TCAP table 1008. After the database function is performed, the call is returned to normal call processing. The database services table 1002 points to the called number table 818.

The SCCP table 1004 contains information and parameters required to build an SCCP message. The SCCP table 1004 is referenced by the database services table 1002 and provides information to the database services table.

The ISNI table 1006 contains network information that is used for routing SCCP message to a destination node. The ISNI table 1006 is referenced by the SCCP table 1004 and provides information to the SCCP table.

The TCAP table 1008 contains information and parameters required to build a TCAP message. The TCAP table 1008 is referenced by the database services table 1002 and provides information to the database services table.

The AIN event parameters table 1010 contains information and parameters that are included in the parameters portion of a TCAP event message. The AIN event parameters table 1010 is referenced by the TCAP table 1008 and provides information to the TCAP table.

Figure 11:
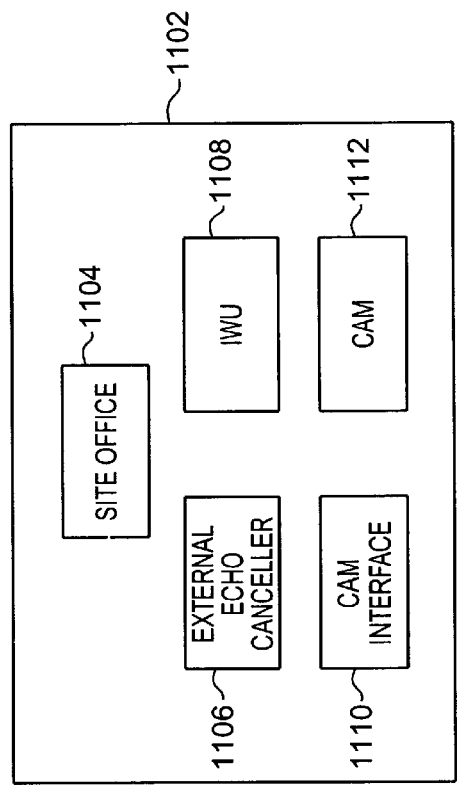
FIG. 11 is a block diagram of additional tables that are used in the signaling processor of FIG. 8.

FIG. 11 is an overlay of FIGS. 8–10. The tables from FIGS. 8–10 are present. However, for clarity, the tables have not been duplicated in FIG. 11. FIG. 11 illustrates additional tables that can be used to setup the call process so that the tables of FIGS. 8–10 may be used. These setup tables 1102 include a site office table 1104, an external echo canceller table 1106, an interworking unit (IWU) table 1108, a controllable ATM matrix (CAM) interface table 1110, and a controllable ATM matrix (CAM) table 1112.

The site office table 1104 contains information which lists office-wide parameters, some of which are information-based and others which affect call processing. The site office table 1104 provides information to the call processor or switch during initialization or other setup procedures, such as population of data or transfer of information to one or more memory locations for use during call processing.

The external echo canceller 1106 contains information that provides the interface identifier and the echo canceller type when an external echo canceller is required. The external echo canceller table 1106 provides information to the call processor or switch during initialization or other setup procedures, such as population of data or transfer of information to one or more memory locations for use during call processing.

The IWU table 1108 contains the internet protocol (IP) identification numbers for interfaces to the interworking units at the call processor or switch site. The IWU table 1108 provides information to the call processor or switch during initialization or other setup procedures, such as population of data or transfer of information to one or more memory locations for use during call processing.

The CAM interface table 1110 contains information for the logical interfaces associated with the CAM. The CAM interface table 1110 provides information to the call processor or switch during initialization or other setup procedures, such as population of data or transfer of information to one or more memory locations for use during call processing.

The CAM table 1112 contains information associated with the logical and physical setup properties of the CAM. The CAM table 1112 provides information to the call processor or switch during initialization or other setup procedures, such as population of data or transfer of information to one or more memory locations for use during call processing.

FIGS. 12–41 depict examples of the various tables described above. It will be appreciated that other versions of tables may be used. In addition, information from the identified tables may be combined or changed to form different tables.

FIG. 12 depicts an example of a TDM trunk circuit table. The TDM trunk circuit table is used to access information about the originating circuit for originating circuit call processing. It also is used to provide information about the terminating circuit for terminating circuit call processing. The trunk group number of the circuit associated with the call is used to enter the table. The group member is the second entry that is used as a key to identify or fill information in the table. The group member identifies the member number of the trunk group to which the circuit is assigned, and it is used for the circuit selection control.

The table also contains the trunk circuit identification code (TCIC). The TCIC identifies the trunk circuit which is typically a DS0. The echo canceller (EC) label entry identifies the echo canceller, if any, which is connected to the circuit. The interworking unit (IWU) label and the interworking unit (IWU) port identify the hardware location and the port number, respectively, of the interworking unit. The DS1/E1 label and the DS1/E1 channel denote the DS1 or the E1 and the channel within the DS1 or E1, respectively, that contains the circuit. The initial state specifies the state of the circuit when it is installed. Valid states include blocked if the circuit is installed and blocked from usage, unequipped if the circuit is reserved, and normal if the circuit is installed and available from usage.

FIG. 13 depicts an example of an ATM trunk circuit table. The ATM trunk circuit table is used to access information about the originating circuit for originating circuit call processing. It also is used to provide information about the terminating circuit for terminating circuit call processing.

The trunk group number of the circuit associated with the call is used to enter the table. The group size denotes the number of members in the trunk group. The starting trunk circuit identification code (TCIC) is the starting TCIC for the trunk group, and it is used in the routing label of an ISUP message. The transmit interface label identifies the hardware location of the virtual path on which the call will be transmitted. The transmit interface label may designate either an interworking unit interface or a CAM interface for the designated trunk members. The transmit virtual path identifier (VPI) is the VP that will be used on the transmission circuit side of the call. The receive interface label identifies the hardware location of the virtual path on which the call will be received. The receive interface label may designate either an interworking unit interface or a CAM interface for the designated trunk members. The receive virtual path identifier (VPI) is the VP that will be used on the reception circuit side of the call. The initial state specifies the state of the circuit when it is installed. Valid states include blocked if the circuit is installed and blocked from usage, unequipped if the circuit is reserved, and normal if the circuit is installed and available from usage.

FIG. 14A depicts an example of a trunk group table. The trunk group number of the trunk group associated with the circuit is used to key into the trunk group table. The administration information field is used for information purposes concerning the trunk group and typically is not used in call processing. The associated point code is the point code for the far end switch or call processor to which the trunk group is connected. The common language location identifier (CLLI) entry is a standardized Bellcore entry for the associated office to which the trunk group is connected. The trunk type identifies the type of the trunk in the trunk group. The trunk type may be a TDM trunk, an ATM trunk from the interworking unit, or an ATM trunk from the CAM.

The associated numbering plan area (NPA) contains information identifying the switch from which the trunk group is originating or to which the trunk group is terminating. The associated jurisdiction information parameter (JIP) contains information identifying the switch from which the trunk group is originating or to which the trunk group is terminating. If an ISUP JIP is received, an outgoing JIP has the same value as the received JIP. If an ISUP JIP is not received in an IAM, and a default JIP value is present, then call processing will populate the JIP of the outgoing IAM with the default value from the trunk group table. If a JIP is not received, and there is no default JIP value, then an outgoing JIP is not transmitted.

The time zone label identifies the time zone that should be used when computing a local date and a local time for use with a day of year table, the day of week table, and the time of day table. The echo canceller information field describes the trunk group echo cancellation requirements. Valid entries for the echo canceller information include normal for a trunk group that uses internal echo cancellation, external for a trunk group that requires external echo cancellers, and disable for a trunk group that requires no echo cancellation for any call passing over the group.

FIG. 14B is a continuation of FIG. 14A for the trunk group table. The satellite entry specifies that the trunk group for the circuit is connected through a satellite. If the trunk group uses too many satellites, then a call should not use the identified trunk group. This field is used in conjunction with the nature of connection satellite indicator field from the incoming IAM to determine if the outgoing call can be connected over this trunk group. The select sequence indicates the methodology that will be used to select a connection. Valid entries for the select sequence field include the following: most idle, least idle, ascending, or descending. The interworking unit (IWU) priority signifies that outgoing calls will attempt to use a trunk circuit on the same interworking unit before using a trunk circuit on a different interworking unit.

Glare resolution indicates how a glare situation is to be resolved. Glare is the dual seizure of the same circuit. If the glare resolution entry is set to "even/odd," the switch or the call processor with the higher point code value will control the even number TCICs within the trunk group. The switch or call processor with the lower point code value will control the odd number TCICs. If the glare resolution entry is set to "all," the call processor controls all of the TCICs within the trunk group. If the glare resolution entry is set to "none," the call processor will have no glare control and will yield to all double seizures within the trunk group.

Continuity control indicates whether continuity is to be checked. Continuity for outgoing calls on the originating call processor are controlled on a trunk group basis. This field specifies whether continuity is not required or whether continuity is required and the frequency of the required check. The field identifies a percentage of the calls that require continuity check.

The reattempt entry specifies how many times the outgoing call will be reattempted using a different circuit from the same trunk group after a continuity check failure, a glare, or other connection failure. The ignore local number portability (LNP) information specifies whether or not the incoming LNP information is ignored. The treatment label is a label into the treatment table for the trunk group used on the call. Because specific trunk group connections may require specific release causes or treatments for a specific customer, this field identifies the type of treatment that is required. The message mapping label is a label into the message mapping table which specifies the backward message configuration that will be used on the trunk group.

FIG. 14C is a continuation of FIG. 14B for the trunk group table. The queue entry signifies that the terminating part of the trunk group is capable of queuing calls originating from a subscriber that called a number which terminates in this trunk group. The ring no answer entry specifies whether the trunk group requires ring no answer timing. If the entry is set to 0, the call processing will not use the ring no answer timing for calls terminated on the trunk group. A number other than 0 specifies the ring no answer timing in seconds for calls terminating on this trunk group. The voice path cut through entry identifies how and when the terminating call's voice path will be cut through on the trunk group. The options for this field include the following: connect for a cut through in both directions after receipt of an ACM, answer for cut through in the backward direction upon receipt of an ACM, then cut through in the forward direction upon receipt of an ANM, or immediate for cut through in both directions immediately after an IAM has been sent.

The originating class of service (COS) label provides a label into a class of service table that determines how a call is handled based on the combination of the originating COS and the terminating COS from another trunk group. Based on the combination of this field and the terminating COS of another trunk group's field, the call will be handled differently. For example, the call may be denied, route advanced, or otherwise processed. The terminating class of service (COS) label provides a label into a class of service table that determines how a call is handled based on the combination of the originating COS from another trunk group and the terminating COS from the present trunk group. Based on a combination of this field and the originating COS the call will be handled differently. For example, the call may be denied, route advanced, or otherwise processed.

Call control provides an index to a specific trunk group level traffic management control. Valid entries include normal for no control applied, skip control, applied wide area telecommunications service (WATS) reroute functionality, cancel control, reroute control overflow, and reroute immediate control. The next function points to the next table, and the next label points to an entry or a range of entries in that table.

FIG. 15 depicts an example of a carrier table. The carrier label is the key to enter the table. The carrier identification (ID) specifies the carrier to be used by the calling party. The carrier selection entry identifies how the caller specifies the carrier. For example, it identifies whether the caller dialed a prefix digit or whether the caller was pre-subscribed. The carrier selection is used to determine how the call will be routed. The next function points to the next table, and the next label defines an area in that table for further call processing.

FIG. 16 depicts an example of an exception table. The exception label is used as a key to enter the table. The calling party's category entry specifies how to process a call from an ordinary subscriber, an unknown subscriber, or a test phone. The called number nature of address differentiates between 0+ calls, 1+ calls, test calls, local routing number (LRN) calls, and international calls. For example, international calls might be routed to a pre-selected international carrier. The called number "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" is a decimal number ranging from 1–15 digits. It can be any length and, if filled with less than 15 digits, is filled with 9s for the remaining digits. The next function and next label entries point to the next table and the next entry within that table for the next routing function.

FIG. 17 depicts an example of the originating line information (OLI) table. The OLI label is used as a key to enter the table from a prior next function operation. The originating line information entry specifies the information digits that are being transmitted from a carrier. Different calls are differentiated based on the information digits. For example, the information digits may identify an ordinary subscriber, a multi-party line, N00 service, prison service, cellular service, or private pay station. The next function and next label entries point to the next table and the area within that table for the next routing function.

FIG. 18 depicts an example of an automatic number identification (ANI) table. The ANI label is used as a key to enter the table from a prior next option. The charge calling party number "digits from" and "digits to" focus further processing unique to ANI within a given range. These entries are looked at to determine if the incoming calling number falls within the "digits from" and "digits to" fields. The time zone label indicates the entry in the time zone table that should be used when computing the local date and time. The time zone label overrides the time zone information from the trunk group table 806.

The customer information entry specifies further customer information on the originating side for call process routing. The echo cancellation (EC) information field specifies whether or not to apply echo cancellation to the associated ANI. The queue entry identifies whether or not queuing is available to the calling party if the called party is busy. Queuing timers determine the length of time that a call can be queued. The treatment label defines how a call will be treated based on information in the treatment table. For example, the treatment label may send a call to a specific recording based on a dialed number. The next function and next label point to the next table and an area within that table for further call processing.

FIG. 19 depicts an example of a called number screening table. The called number screening label is used as a key to enter the table. The called number nature of address indicates the type of dialed number, for example, national versus international. The nature of address entry allows the call process to route a call differently based on the nature of address value provided. The "digits from" and "digits to" entries focus further processing unique to a range of called numbers. The "digits from" and "digits to" columns both contain called number digits, such as NPA-NXX ranges, that may contain ported numbers and are checked for an LRN. This table serves as the trigger detection point (TDP) for an LNP TCAP when, for example, NPA-NXXs of donor switches that have had subscribers port their numbers are data filled in the "digits from" and "digits to" fields. The delete digits field provides the number of digits to be deleted from the called number before processing continues. The next function and next label point to the next table and the area within that table for further call processing.

FIG. 20 depicts an example of a called number table. The called number label is used as a key to enter the table. The called number nature of address entry indicates the type of dialed number, for example, national versus international. The "digits from" and "digits to" entries focus further processing unique to a range of numbers, including LRNs. The next function and next label point to a next table and the area within that table used for further call processing.

FIG. 21 depicts an example of a day of year table. The day of year label is used as a key to enter the table. The date field indicates the local date which is applicable to the action to be taken during the processing of this table. The next function and next label identify the table and the area within that table for further call processing.

FIG. 22 depicts an example of a day of week table. The day of week label is a key that is used to enter the table. The "day from" field indicates the local day of the week on which the action to be taken by this table line entry is to start. The "day to" field indicates the local day of the week on which the action to be taken by this table line entry is to end. The next function and next label identify the next table and the area within that table for further call processing.

FIG. 23 depicts an example of a time of day table. The time of day label is used as a key to enter the table from a prior next function. The "time from" entry indicates the local time on which an action to be taken is to start. The "time to" field indicates the local time just before which the action to be taken is to stop. The next function and next label entries identify the next table and the area within that table for further call processing.

FIG. 24 depicts an example of a time zone table. The time zone label is used as a key to enter the table and to process an entry so that a customer's local date and time may be computed. The coordinated universal time (UTC) indicates a standard offset of this time zone from the UTC. The UTC is also known as Greenwich mean time, GMT, or Zulu. The UTC should be positive for time zones east of Greenwich, such as Europe and Asia, and negative for time zones west of Greenwich, such as North America. The daylight savings entry indicates whether daylight savings time is used during the summer in this time zone.

FIG. 25 depicts an example of a routing table. The routing label is used as a key to enter the table from a prior next function. The route number specifies a route within a route list. Call processing will process the route choices for a given route label in the order indicated by the route numbers. The next function and next label identify the next table and the area within that table for further call processing. The signal route label is associated with the next action to be taken by call processing for this call. The signal route label provides the index to access the message mapping label. The signal route label is used in order to modify parameter data fields in a signaling message that is being propagated to a next switch or a next call processor.

FIG. 26 depicts an example of a trunk group class of service (COS) table. The originating trunk COS label and the terminating trunk COS label are used as keys to enter the table and define call processing. The next function identifies the next action that will be taken by call processing for this call. Valid entries in the next function column may be continued, treat, route advanced, or routing. Based on these entries call processing may continue using the current trunk group, send the calls to treatment, skip the current trunk group and the routing table and go to the next trunk group on the list, or send the call to a different label in the routing table. The next label entry is a pointer that defines the trunk circuit group that the next function will use to process the call. This field is ignored when the next function is continued or route advanced.

FIG. 27 depicts an example of a treatment table. The treatment label is a key that is used to enter the table. The treatment label is a designation in a call process that determines the disposition of the call. The error/cause label correspond either to internally generated error conditions and call processing or to incoming release cause values. For each treatment label, there will be a set of error conditions and cause values that will be associated with a series of labels for the call processing error conditions and a series of labels for all incoming release message cause values. The next function and next label point to the next table and the area within that table for further call processing.

FIG. 28 depicts an example of an outgoing release table. The outgoing release label is used as a key to enter the table for processing. The outgoing cause value location identifies the type of network to be used. For example, the location entry may specify a local or remote network or a private, transit, or international network. The coding standard identifies the standard as an International Telecommunications Union (ITU) standard or an American National Standards Institute (ANSI) standard. The cause value designates error, maintenance, or non-connection processes.

FIG. 29 depicts an example of a percent control table. The percent label is used as a key to enter the table. The control percentage specifies the percentage of incoming calls that will be affected by the control. The control next function allows attempts for call connection to be routed to another table during call processing. The control next label points to an area within that table for further call processing. The passed next function allows only incoming attempts to be routed to another table. The next label points to an area in that table for further call processing.

FIG. 30 depicts an example of a call rate table. The call rate label is used as a key to enter the table. The call rate specifies the number of calls that will be passed by the control on or for completion. Call processing will use this information to determine if the incoming call number falls within this control. The control next function allows a blocked call attempt to be routed to another table. The control next label is a pointer that defines the area in the next table for further call processing. The passed next function allows only an incoming call attempt to be rerouted to another table. The passed next function is a pointer that defines an area in that table for further call processing.

FIG. 31 depicts an example of a database services table. The database services label is used as a key to enter the table. The service type determines the type of logic that is applied when building and responding to database queries. Service types include local number portability and N00 number translation. The signaling connection control part (SCCP) label identifies a location within an SCCP table for further call processing. The transaction capabilities application part (TCAP) label identifies a location within a TCAP table for further processing. The next function identifies the location for the next routing function based on information contained in the database services table as well as information received from a database query. The next label entry specifies an area within the table identified in the next function for further processing.

FIG. 32A depicts an example of a signaling connection control part (SCCP) table. The SCCP label is used as a key to enter the field. The message type entry identifies the type of message that will be sent in the SCCP message. Message types include Unitdata messages and Extended Unitdata messages. The protocol class entry indicates the type of protocol class that will be used for the message specified in the message type field. The protocol class is used for connectionless transactions to determine whether messages are discarded or returned upon an error condition. The message handling field identifies how the destination call processor or switch is to handle the SCCP message if it is received with errors. This field will designate that the message is to be discarded or returned. The hop counter entry denotes the number of nodes through which the SCCP message can route before the message is returned with an error condition. The segmentation entry denotes whether or not this SCCP message will use segmentation and send more than one SCCP message to the destination.

FIG. 32B is a continuation of FIG. 32A for the SCCP table. The intermediate signaling network identification (ISNI) fields allow the SCCP message to traverse different networks in order to reach a desired node. The ISNI type identifies the type of ISNI message format that will be used for this SCCP message. The route indicator subfield identifies whether or not this SCCP message requires a special type of routing to go through other networks. The mark identification subfield identifies whether or not network identification will be used for this SCCP message. The label subfield identifies a unique address into the ISNI table when the route indicator sub-field is set to "constrained" and the mark identification subfield is set to "yes."

FIG. 32C is a continuation of FIG. 32B for the SCCP table. FIG. 32C identifies the called party address field and subfields to provide information on how to route this SCCP message. The address indicator subsystem number (SSN) indicates whether or not a subsystem number will be included in the called party address. The point code entry indicates whether or not a point code will be included in the calling party address. The global title indicator subfield identifies whether or not a global title translation will be used to route the SCCP message. If a global title translation is chosen, this subfield also identifies the type. The routing indicator subfield identifies the elements that will be used to route the message. Valid entries include global title and point code. The national/international subfield identifies whether the SCCP message will use national or international routing and set up.

The subsystem number field identifies the subsystem number for the SCCP message. The point code number indicates the destination point code to which the SCCP message will be routed. This field will be used for routing messages that do not require SCCP translation.

The global title translation field allows intermediate nodes to translate SCCP messages so that the messages can be routed to the correct destination with the correct point code. The global title translation type entry directs the SCCP message to the correct global title translation function. The encode scheme identifies how the address type will be encoded. The number plan subfield identifies the numbering plan that will be sent to the destination node. The address type subfield will identify which address type to use for address digits and the SCCP routing through the network.

FIG. 32D is a continuation of FIG. 32C for the SCCP table. FIG. 32D identifies the calling party address field which contains the routing information that the destination database uses to retain the SCCP message. The address indicator subsystem number (SSN) indicates whether or not a subsystem number will be included in the called party address. The point code subfield indicates whether or not a point code will be included in the calling party address. The global title indicator subfield identifies whether or not global title translation will be used to route the SCCP message. The routing indicator subfield identifies which elements will be used throughout the message. This field may include global title elements or point code elements. The national/international subfield identifies whether the SCCP will use national or international routing and set up.

The subsystem number identifies a subsystem number for the SCCP message. The point code number field indicates the destination point code to which the SCCP message will be routed. The global title translations allow the intermediate nodes to translate SCCP messages and to route the messages to the correct destination. The global title translation type directs the SCCP message to the correct global title translation function. The encode scheme identifies how the address type will be encoded. The number plan identifies the number plan that will be sent to the destination node. The address type subfield identifies the address type to use for address digits in the SCCP routing through the network.

FIG. 33 depicts an example of an intermediate signaling network identification (ISNI) table. The ISNI table contains a list of networks that will be used for routing SCCP messages to the destination node. The ISNI label is used as a key to enter the table. The network fields 1–16 identify the network number of up to 16 networks that may be used for routing the SCCP message.

FIG. 34 depicts an example of a transaction capabilities application part (TCAP) table. The TCAP label is used as a key to enter the table. The TCAP type identifies the type of the TCAP that will be constructed. The TCAP types include advanced intelligent network (AIN) and distributed intelligent network architecture (DINA). The tag class indicates whether the message will use a common or proprietary structure. The package type field identifies the package type that will be used in the transaction portion of the TCAP message. The component type field identifies the component type that will be used in the component portion of the TCAP message. The message type field identifies the type of TCAP message. Message types include variable options depending on whether they are AIN message types or DINA message types.

FIG. 35 depicts an example of an external echo canceller table. The echo canceller type specifies if an external echo canceller is being used on the circuit and, if so, the type of echo canceller. The echo canceller label points to a location in the controllable ATM matrix table for further call processing. The RS-232 address is the address of the RS-232 interface that is used to communicate with the external echo canceller. The module entry is the module number of the external echo canceller.

FIG. 36 depicts an example of an interworking unit interface table. The interworking unit (IWU) is a key that is used to enter the table. The IWU identification (ID) identifies which interworking unit is being addressed. The internet protocol (IP) sockets 1–4 specify the IP socket address of any of the four connections to the interworking unit.

FIG. 37 depicts an example of a controllable ATM matrix (CAM) interface table. The CAM interface label is used as a key to enter the table. The CAM label indicates which CAM contains the interface. The logical interface entry specifies a logical interface or port number in the CAM.

FIG. 38 depicts an example of a controllable ATM matrix (CAM) table. The CAM label is used as a key to enter the table. The CAM type indicates the type of CAM control protocol. The CAM address identifies the address of the CAM.

FIG. 39A depicts an example of a call processor or switch site office table. The office CLLI name identifies a CLLI of the associated office for the call processor or switch. The call processor or switch site node identifier (ID) specifies the call processor or switch node identifier. The call processor or switch origination identifier (ID) specifies a call processor or switch origination identifier. The software identifier (ID) specifies a software release identifier. The call processor identifier (ID) specifies the call processor or switch identifier that is sent to the inter working units.

FIG. 39B is a continuation of FIG. 39A of the call processor or switch site office table. The automatic congestion control (ACC) specifies whether ACC is enabled or disabled. The automatic congestion control level (ACL) 1 onset identifies an onset percentage value of a first buffer utilization. The ACL 1 abate entry specifies an abatement percentage of utilization for a first buffer. The ACL 2 onset entry specifies an onset level for a second buffer. The ACL 2 abate entry specifies an abatement level percentage of buffer utilization for a second buffer. The ACL 3 onset entry specifies an onset level percentage of buffer utilization for a third buffer. The ACL 3 abate entry specifies an abatement level percentage of buffer utilization for a third buffer.

FIG. 39C is a continuation of FIG. 39B for the call processor or switch site office table. The maximum trunks for the off hook queuing (max trunks OHQ) specifies a maximum number of trunk groups that can have the off hook queuing enabled. The OHQ timer one (TQ1) entry specifies the number of milliseconds for the off hook timer number one. The OHQ timer two (TQ2) entry specifies the number of seconds for the off hook timer number two. The ring no answer timer specifies the number of seconds for the ring no answer timer. The billing active entry specifies whether ECDBs are being sent to the call processing control system (CPCS). The network management (NWM) allow entry identifies whether or not a selective trunk reservation and group control are allowed or disallowed. The billing failure free call entry specifies if a call will not be billed if the billing process is unavailable. The billing failure free call will either be enabled for free calls or disabled so that there are no free calls.

FIG. 39D is a continuation of FIG. 39C for the call processor or switch site office table. The maximum (max) hop counts identifies the number of call processor or switch hops that may be made in a single call. The maximum (max) table lookups identifies the number of table lookups that may performed for a single call. This value is used to detect loops in routing tables.

FIGS. 40A–40B depict an example of an advanced intelligent network (AIN) event parameters table. The AIN event parameters table has two columns. The first identifies the parameters that will be included in the parameters portion of the TCAP event message. The second entry may include information for analysis.

FIG. 41 depicts an example of a message mapping table. This table allows the call processor to alter information in outgoing messages. The message type field is used as a key to enter the table and represents the outgoing standard message type. The parameters entry is a pertinent parameter within the outgoing message. The indexes point to various entries in the trunk group and determine if parameters are passed unchanged, omitted, or modified in the outgoing messages.

The system of FIGS. 3–41 operates as follows. With reference to FIGS. 7–10, incoming call signaling for a call is handled first by the signaling interface 704. The signaling interface 704 strips the header information from the call signaling and transmits the call signaling parameters to the call processor 708.

The signaling interface 704 can contain the logic that appends the 1 to the NOA if the call is ported. The signaling interface 704 can determine whether the call is ported by determining whether a PNP parameter is present and/or set. For example, the signaling interface 704 can determine if the FCI parameter is set to "translated" or "not translated" and/or whether a ported number GAP is present in the call signaling. Additionally, the signaling interface 704 can determine if a response from a PNDB 110 contains an LRN or the dialed number and use that response information to determine if the call is ported.

Alternately, the call processor 708 can determine if the call is ported by the above methods. Preferably, the call processor 708 has routing logic that determines if the call is ported, appends the 1 to the NOA before or while the call processing parameters are processed by the routing tables, and removes the 1 from the NOA after the call signaling has been processed through the routing tables for the ported call.

Preferably, the exception table 810, the called number screening table 816, and the called number table 818 can be used to screen the call signaling parameters to determine whether a call is ported. Most preferably, the called number table 818 is used to determine if the dialed number is ported and to split route selection and the translations tables between non-ported calls and ported calls, thereby segregating the routing.

In a first example, routing logic in the call processor 708 processes the call signaling parameters, determines that the call is ported, and determines that a query to a PNDB has occurred. In this example, the FCI parameter is present and set to "translated", and a ported number GAP is present. Thus, the dialed number is in the ported number GAP parameter, and the LRN is in the CdPN parameter.

The routing logic in the call processor 708 appends a 1 to the NOA parameter before the routing tables process the call signaling parameters. Because the NOA has an appended 1, the routing tables process the call signaling parameters with the LRN as a ported call to select the route. When the processing occurs at the called number table 818, the called number table determines that a 1 is appended on the NOA making the NOA an eight bit parameter, meaning that the call is ported.

The called number table 818 splits the processing to the ported number translations to determine a route. The called number table 818 typically then points to the routing table 820 where processing continues for route selection.

Before the processing proceeds out of the routing tables to the routing logic, the 1 is removed from the NOA to make the NOA a seven bit parameter. The removal of the appended 1 can occur any time before the new call signaling message is built. Thus, in an SS7 system, the appended 1 can be removed any time prior to the building of an outgoing SS7 message in the signaling interface 704. Preferably, the appended 1 is removed prior to the processing with MTP 3. Most preferably, the appended 1 is removed as part of the message mapping function in the message mapping table 824.

A new call signaling message is built. Thus, in an SS7 system, an SS7 message is built, and a PNP parameter is set. In an SS7 system, a ported number GAP containing the dialed number digits is added to the call signaling, the LRN is placed in the CdPN parameter, and the FCI bit is set to "translated".

In another example, the call signaling does not contain a PNP parameter. In this example, an FCI parameter is set to "not translated", and a ported number GAP is not present. Therefore, the routing logic in the call processor 708 does not append a 1 to the NOA.

However, in this example, when the call processing parameters are processed by the called number screening table 816, the called number screening table recognizes that the dialed number in the CdPN parameter may be a member of a portable switch. A query is launched by the routing logic, through the signaling interface 704, to the PNDB 110.

The PNDB 110 analyzes the dialed number and responds with either an LRN or the dialed number. In this example, the PNDB determines that the call is ported and returns the LRN in the response.

The response is processed by the signaling interface 704 and by the routing logic in the call processor 708. The routing logic determines that an LRN was returned by the PNDB 110, that the call is ported, and appends a 1 to the NOA. The call processing parameters then are processed by the called number table 818.

The called number table 818 splits the processing to the ported number translations to determine a route. The called number table 818 typically then points to the routing table 820 where processing continues.

Before the processing proceeds out of the routing tables to the routing logic, the 1 is removed from the NOA to make the NOA a seven bit parameter. The removal of the appended 1 can occur any time before the new call signaling message is built. Thus, in an SS7 system, the appended 1 can be removed any time prior to the building of an outgoing SS7 message in the signaling interface 704. Preferably, the appended 1 is removed prior to the processing with MTP 3. Most preferably, the appended 1 is removed as part of a message mapping function in either the routing tables or the routing logic.

A new call signaling message is built. Thus, in an SS7 system, an SS7 message is built, and a PNP parameter is set. In an SS7 system, a ported number GAP containing the DN digits is added to the call signaling, the LRN is placed in the CdPN parameter, and the FCI bit is set to "translated".

In still another example, the call signaling does not contain a PNP parameter. In this example, an FCI parameter is set to "not translated", and a ported number GAP is not present. Therefore, the routing logic in the call processor 708 does not append a 1 to the NOA.

In this example, when the call processing parameters are processed by the called number screening table 816, the called number screening table does not recognize the dialed number in the CdPN parameter as being a member of a portable NPA-NXX. Thus, a query is not launched to the PNDB 110, and a 1 is never appended to the NOA.

The called number table 818 splits the processing to the non-ported number translations to determine a route. The called number table 818 typically then points to the routing table 820 where processing continues.

Because a 1 was never appended to the NOA, removal of an appended 1 is not necessary. A new call signaling message is built. Thus, in an SS7 system, an SS7 message is built, and a PNP parameter is set. In an SS7 system, a ported number GAP is not added to the call signaling, the dialed number digits are placed in the CdPN parameter, and the FCI bit is set to "not translated".

In yet another example, an FCI parameter is set to "translated", and a ported number GAP is not present. Thus, a prior query to a PNDB occurred, and it was determined that the call was not ported. Therefore, the routing logic in the call processor 708 does not append a 1 to the NOA. In this example, a 1 is never appended to the NOA.

The routing tables process the call signaling parameters. The called number table 818 splits the processing to the non-ported number translations to determine a route. The called number table 818 typically then points to the routing table 820 where processing continues.

Because a 1 was never appended to the NOA, removal of an appended 1 is not necessary. A new call signaling message is built. Thus, in an SS7 system, an SS7 message is built, and a PNP parameter is set. In an SS7 system, a ported number GAP is not added to the call signaling, the dialed number digits are placed in the CdPN parameter, and the FCI bit is set to "translated".

In another example, the call signaling does not contain a PNP parameter. In this example, an FCI parameter is set to "not translated", and a ported number GAP is not present. Therefore, the routing logic in the call processor 708 does not append a 1 to the NOA.

However, in this example, when the call processing parameters are processed by the called number screening table 816, the called number screening table recognizes that the dialed number in the CdPN parameter is a member of a portable switch. A query is launched by the routing logic, through the signaling interface 704, to the PNDB 110.

The PNDB 110 analyzes the dialed number and responds with either an LRN or the dialed number. In this example, the PNDB determines that the call is not ported and returns the dialed number in the response.

The response is processed by the signaling interface 704 and by the routing logic in the call processor 708. The routing logic determines that a dialed number was returned by the PNDB 110, that the call is not ported, and does not append a 1 to the NOA. The call processing parameters then are processed by the called number table 818.

The called number table 818 splits the processing to the non-ported number translations to determine a route. The called number table 818 typically then points to the routing table 820 where processing continues.

Because a 1 was never appended to the NOA, removal of an appended 1 is not necessary. A new call signaling message is built. Thus, in an SS7 system, an SS7 message is built, and a PNP parameter is set. In an SS7 system, a ported number GAP is not added to the call signaling, the dialed number digits are placed in the CdPN parameter, and the FCI bit is set to "translated".

It will be appreciated that appending the 1 and removing the appended 1 can occur in either the call processor 708 or the signaling interface 704. In addition, tables other than the called number table 818, such as the exception table 810 or the called number screening table 816, can split the routing for ported or non-ported calls. Moreover, other routing logic or routing tables can accomplish the appending and removal of appended parameters.

Those skilled in the art will appreciate that variations from the specific embodiments disclosed above are contemplated by the invention. The invention should not be restricted to the above embodiments, but should be measured by the following claims.

What is claimed is:

1. A system for connecting a call having call signaling, the system comprising:
   a signaling processor adapted to receive the call signaling and to process the call signaling by partitioning the call for processing within the signaling processor as a ported call by appending a 1 to a ported number processing parameter of a call signaling parameter or by partitioning the call for processing within the signaling processor as a non-ported call by not appending the 1 to the ported number processing parameter.

2. The system of claim 1 wherein the ported number processing parameter comprises a nature of address field.

3. The system of claim 1 wherein the signaling processor further is adapted to process call signaling parameters to determine a processing option or a connection for the call.

4. The system of claim 3 wherein the signaling processor further is adapted to process the call signaling parameters with routing logic to determine the processing option or the connection for the call.

5. The system of claim 3 wherein the signaling processor further is adapted to process the call signaling parameters with routing tables to determine the processing option or the connection for the call.

6. The system of claim 1 wherein the signaling processor further is adapted to remove an appended 1 from the ported number processing parameter after the call signaling has been processed to determine a processing option or a connection for the call.

7. The system of claim 1 wherein the signaling processor further is adapted to determine new call signaling and to transmit new call signaling after the signaling processor has processed the call signaling for 1 of the ported call or the non-ported call.

8. The system of claim 1 wherein the signaling processor further is adapted to process the call signaling to determine if the call is the ported call or the non-ported call.

9. The system of claim 1 wherein the signaling processor further is adapted to determine if a ported number parameter is present in the call signaling.

10. The system of claim 9 wherein the ported number parameter is present in the call signaling and wherein the signaling processor further is adapted to process the call as the ported call.

11. The system of claim 9 wherein the ported number parameter comprises a forward call indicator parameter.

12. The system of claim 11 wherein the ported number parameter further comprises a ported number generic address parameter.

13. The system of claim 10 wherein the ported number parameter comprises a ported number generic address parameter.

14. The system of claim 1 wherein the signaling processor further is adapted to transmit a query requesting ported number information and to process a response to the query.

15. The system of claim 14 wherein the response comprises a location routing number and wherein the signaling processor further is adapted to process the call as the ported call.

16. The system of claim 14 wherein the response comprises dialed number digits and wherein the signaling processor further is adapted to process the call as the non-ported call.

17. A system for connecting a call having call signaling, the system comprising:
a signaling processor adapted to receive the call signaling and to process the call signaling by partitioning the call for processing as a ported call by appending a 1 to a nature of address field of a called number party parameter or by partitioning the call for processing as a non-ported call by not appending the 1 to the nature of address field.

18. A system for connecting a call having call signaling, the system comprising:
a signaling processor adapted to receive the call signaling, to process the call signaling to determine if a ported number parameter is present, and, if present, to partition the call for processing as a ported call by appending a 1 to a ported number processing parameter.

19. The system of claim 18 wherein the ported number processing parameter comprises a nature of address field.

20. The system of claim 18 wherein the signaling processor further is adapted to process call signaling parameters to determine a processing option or a connection for the call.

21. The system of claim 18 wherein the signaling processor further is adapted to remove an appended 1 from the ported number processing parameter after the call signaling has been processed to determine a processing option or a connection for the call.

22. The system of claim 18 wherein the signaling processor further is adapted to determine new call signaling and to transmit new call signaling after the signaling processor has processed the call signaling for one of the ported call or the non-ported call.

23. The system of claim 18 wherein the signaling processor further is adapted to process the call signaling to determine if the call is the ported call or the non-ported call.

24. The system of claim 18 wherein the ported number parameter comprises one or more of a forward call indicator parameter and a ported number generic address parameter.

25. The system of claim 18 wherein the signaling processor further is adapted to transmit a query requesting ported number information and to process a response to the query.

26. The system of claim 25 wherein the response comprises a location routing number and wherein the signaling processor further is adapted to process the call as the ported call.

27. The system of claim 25 wherein the response comprises dialed number digits and wherein the signaling processor further is adapted to process the call as the non-ported call.

28. A system for connecting a call having call signaling, the system comprising:
a signaling processor adapted to receive the call signaling, to process the call signaling to determine if the call is a ported call, and, if the call is the ported call, to partition the call for further processing within the signaling processor as the ported call by appending a 1 to a ported number processing parameter.

29. The system of claim 28 the ported number processing parameter comprises a nature of address field.

30. The system of claim 28 wherein the signaling processor further is adapted to process call signaling parameters to determine a processing option or a connection for the call.

31. The system of claim 30 wherein the signaling processor further is adapted to process the call signaling parameters with routing logic to determine the processing option or the connection for the call.

32. The system of claim 30 wherein the signaling processor further is adapted to process the call signaling parameters with routing tables to determine the processing option or the connection for the call.

33. The system of claim 28 wherein the signaling processor further is adapted to remove an appended 1 from the ported number processing parameter after the call signaling has been processed to determine a processing option or a connection for the call.

34. The system of claim 28 wherein the signaling processor further is adapted to determine new call signaling and to transmit new call signaling after the signaling processor has processed the call signaling for one of the ported call or the non-ported call.

35. The system of claim 28 wherein the signaling processor further is adapted to determine if the call is the ported call by determining if a ported number parameter is present in the call signaling.

36. The system of claim 35 wherein the ported number parameter is present in the call signaling and wherein the signaling processor further is adapted to process the call as the ported call.

37. The system of claim 35 wherein the ported number parameter comprises a forward call indicator parameter.

38. The system of claim 36 wherein the ported number parameter further comprises a ported number generic address parameter.

39. The system of claim 35 wherein the ported number parameter comprises a ported number generic address parameter.

40. The system of claim 28 wherein the signaling processor further is adapted to transmit a query requesting ported number information and to process a response to the query.

41. The system of claim 40 wherein the response comprises a location routing number and wherein the signaling processor further is adapted to process the call as the ported call.

42. The system of claim 40 wherein the response comprises dialed number digits and wherein the signaling processor further is adapted to process the call as the non-ported call.

43. A system for connecting a call having call signaling, the system comprising:
a signaling processor adapted to receive the call signaling, to process the call signaling to determine if the call is a ported call, and, if the call is the ported call, to partition the call for further processing within the signaling processor as the ported call by appending a 1 to a nature of address field of a called party number field parameter of the call signaling.

44. A method for connecting a call having call signaling, the method comprising:
receiving the call signaling and processing the call signaling;
partitioning the call for processing as a ported call by appending a 1 to a ported number processing parameter of a call signaling parameter; and
partitioning the call for processing as a non-ported call by not appending the 1 to the ported number processing parameter.

45. The method of claim 44 wherein the ported number processing parameter comprises a nature of address field.

46. The method of claim 44 further comprising processing call signaling parameters to determine a processing option or a connection for the call.

47. The method of claim 46 further comprising processing the call signaling parameters with routing logic to determine the processing option or the connection for the call.

48. The method of claim 46 further comprising processing the call signaling parameters with routing tables to determine the processing option or the connection for the call.

49. The method of claim 44 further comprising removing an appended 1 from the ported number processing parameter after the call signaling has been processed to determine a processing option or a connection for the call.

50. The method of claim 44 further comprising determining new call signaling and transmitting new call signaling after the call signaling has been processed for one of the ported call or the non-ported call.

51. The method of claim 44 further comprising processing the call signaling to determine if the call is the ported call or the non-ported call.

52. The method of claim 44 further comprising determining if a ported number parameter is present in the call signaling.

53. The method of claim 52 wherein the ported number parameter is present in the call signaling and wherein the method further comprises processing the call as the ported call.

54. The method of claim 52 wherein the ported number parameter comprises a forward call indicator parameter.

55. The method of claim 54 wherein the ported number parameter further comprises a ported number generic address parameter.

56. The method of claim 52 wherein the ported number parameter comprises a ported number generic address parameter.

57. The method of claim 44 further comprising transmitting a query requesting ported number information and processing a response to the query.

58. The method of claim 57 wherein the response comprises a location routing number and wherein the method further comprises processing the call as the ported call.

59. The method of claim 57 wherein the response comprises dialed number digits and wherein the method further comprises processing the call as the non-ported call.

60. A method for connecting a call having call signaling, the method comprising:
receiving the call signaling and processing the call signaling;
partitioning the call for processing as a ported call by appending a 1 to a nature of address field of a called number party parameter; and
partitioning the call for processing as a non-ported call by not appending the 1 to the nature of address field.

61. A method for connecting a call having call signaling, the method comprising:
receiving the call signaling and processing the call signaling to determine if a ported number parameter is present; and
partitioning the call for processing as a ported call by appending a 1 to a ported number processing parameter if the ported number parameter is present.

62. The method of claim 61 wherein the ported number processing parameter comprises a nature of address field.

63. The method of claim 61 further comprising processing call signaling parameters to determine a processing option or a connection for the call.

64. The method of claim 61 further comprising removing an appended 1 from the ported number processing parameter after the call signaling has been processed to determine a processing option or a connection for the call.

65. The method of claim 61 further comprising determining new call signaling and transmitting new call signaling after the call signaling has been processed for one of the ported call or the non-ported call.

66. The method of claim 61 further comprising processing the call signaling to determine if the call is the ported call or the non-ported call.

67. The method of claim 61 wherein the ported number parameter comprises one or more of a forward call indicator parameter and a ported number generic address parameter.

68. The method of claim 61 further comprising transmitting a query requesting ported number information and processing a response to the query.

69. The method of claim 68 wherein the response comprises a location routing number and wherein the method further comprises processing the call as the ported call.

70. The method of claim 68 wherein the response comprises dialed number digits and wherein the method further comprises processing the call as the non-ported call.

71. A method for connecting a call having call signaling, the method comprising:

receiving the call signaling and processing the call signaling to determine if the call is a ported call; and partitioning the call for further processing as the ported call by appending a 1 to a ported number processing parameter if the call is the ported call.

72. The method of claim 71 wherein the ported number processing parameter comprises a nature of address field.

73. The method of claim 71 further comprising processing call signaling parameters to determine a processing option or a connection for the call.

74. The method of claim 73 further comprising processing the call signaling parameters with routing logic to determine the processing option or the connection for the call.

75. The method of claim 73 further comprising processing the call signaling parameters with routing tables to determine the processing option or the connection for the call.

76. The method of claim 71 further comprising removing an appended 1 from the ported number processing parameter after the call signaling has been processed to determine a processing option or a connection for the call.

77. The method of claim 71 further comprising determining new call signaling and transmitting new call signaling after the call signaling has been processed for one of the ported call or the non-ported call.

78. The method of claim 71 further comprising processing the call signaling to determine if the call is the ported call by determining if the ported number parameter is present in the call signaling.

79. The method of claim 78 wherein the ported number parameter is present in the call signaling and wherein the method further comprises processing the call as the ported call.

80. The method of claim 78 wherein the ported number parameter comprises a forward call indicator parameter.

81. The method of claim 80 wherein the ported number parameter further comprises a ported number generic address parameter.

82. The method of claim 78 wherein the ported number parameter comprises a ported number generic address parameter.

83. The method of claim 78 further comprising transmitting a query requesting ported number information and processing a response to the query.

84. The method of claim 83 wherein the response comprises a location routing number and wherein the method further comprises processing the call as the ported call.

85. The method of claim 83 wherein the response comprises dialed number digits and wherein the method further comprises processing the call as the non-ported call.

86. A method for connecting a call having call signaling, the method comprising:

receiving the call signaling and processing the call signaling to determine if the call is a ported call; and partitioning the call for further processing as the ported call by appending a 1 to a nature of address field of a called party number field parameter of the call signaling if the call is the ported call.

87. A system for connecting a call having call signaling and user communications, the system comprising:

a signaling processor adapted to receive the call signaling and to process the call signaling by partitioning the call for processing within the signaling processor as a ported call by appending a 1 to a ported number processing parameter of a call signaling parameter or by partitioning the call for processing within the signaling processor as a non-ported call by not appending the 1 to the ported number processing parameter; and a communication device adapted to receive, to handle, to transmit at least one of a group of the call signaling, the user communications, and a control message.

88. The system of claim 87 wherein the ported number processing parameter comprises a nature of address field.

89. The system of claim 87 wherein the signaling processor further is adapted to process call signaling parameters to determine a processing option or a connection for the call.

90. The system of claim 89 wherein the signaling processor further is adapted to process the call signaling parameters with routing logic to determine the processing option or the connection for the call.

91. The system of claim 89 wherein the signaling processor further is adapted to process the call signaling parameters with routing tables to determine the processing option or the connection for the call.

92. The system of claim 87 wherein:

the signaling processor is adapted to process the call signaling to select a connection for the user communications and to transmit a control message identifying the selected connection; and the communication device comprises a connection system adapted to receive the control message and, in response thereto, to connect the user communications over the selected connection.

93. The system of claim 92 further comprising another communication device adapted to receive the user communications over the selected connection.

94. The system of claim 92 further comprising another communication device adapted to transport the user communications to the communication device.

95. The system of claim 87 wherein:

the signaling processor is adapted to process the call signaling to select a connection for the user communications and to transmit a control message identifying the selected connection; and the communication device comprises an interworking unit adapted to receive the control message and, in response thereto, to interwork the user communications over the selected connection.

96. The system of claim 87 wherein:

the signaling processor is adapted to process the call signaling to select a time division multiplex connection for the user communications and to transmit a control message identifying the selected connection; and the communication device comprises an interworking unit adapted to receive the control message and, in response thereto, to connect the user communications from a time division multiplex connection over the selected time division multiplex connection.

97. The system of claim 87 wherein:

the signaling processor is adapted to process the call signaling to select a connection for the user communications and to transmit a control message identifying the selected connection; and the communication device comprises an asynchronous transfer mode matrix adapted to receive the control message and, in response thereto, to connect the user communications over the selected connection.

98. The system of claim 87 wherein the signaling processor further is adapted to remove an appended 1 from the ported number processing parameter after the call signaling has been processed to determine a processing option or a connection for the call.

99. The system of claim 87 wherein the signaling processor further is adapted to determine new call signaling and to transmit new call signaling after the signaling processor has processed the call signaling for one of the ported call or the non-ported call.

100. The system of claim 87 wherein the signaling processor further is adapted to process the call signaling to determine if the call is the ported call or the non-ported call.

101. The system of claim 100 wherein the signaling processor further is adapted to determine if a ported number parameter is present in the call signaling.

102. The system of claim 101 wherein the ported number parameter is present in the call signaling and wherein the signaling processor further is adapted to process the call as the ported call.

103. The system of claim 101 wherein the ported number parameter comprises a forward call indicator parameter.

104. The system of claim 103 wherein the ported number parameter further comprises a ported number generic address parameter.

105. The system of claim 101 wherein the ported number parameter comprises a ported number generic address parameter.

106. The system of claim 87 wherein:
the signaling processor further is adapted to transmit a query requesting ported number information and to process a response to the query; and
the communication device comprises a ported number database adapted to receive the query, to process the query, and to transmit a response to the query, the response having ported number information.

107. The system of claim 106 wherein the response comprises a location routing number and wherein the signaling processor further is adapted to process the call as the ported call.

108. The system of claim 106 wherein the response comprises dialed number digits and wherein the signaling processor further is adapted to process the call as the non-ported call.

109. The system of claim 87 wherein the communication device comprises a switch adapted to transmit the call signaling to the signaling processor.

110. The system of claim 87 wherein the communication device comprises a switch adapted to receive new call signaling from the signaling processor.

111. A system for connecting a call having call signaling and user communications, the system comprising:
a signaling processor adapted to receive the call signaling and to process the call signaling by partitioning the call for processing as a ported call by appending a 1 to a nature of address field of a called number party parameter or by partitioning the call for processing as a non-ported call by not appending the 1 to the nature of address field; and
a communication device adapted to receive, to handle, or to transmit at least one of a group of the call signaling, the user communications, and a control message.

112. A system for connecting a call having call signaling and user communications, the system comprising:
a signaling processor adapted to receive the call signaling, to process the call signaling to determine if a ported number parameter is present, and, if present, to partition the call for processing as a ported call by appending a 1 to a ported number processing parameter; and
a communication device adapted to receive, to handle, and/or to transmit at least one of a group of the call signaling, the user communications, and a control message.

113. The system of claim 112 wherein the ported number processing parameter comprises a nature of address field.

114. The system of claim 112 wherein the signaling processor further is adapted to process call signaling parameters to determine a processing option or a connection for the call.

115. The system of claim 112 wherein:
the signaling processor is adapted to process the call signaling to select a connection for the user communications and to transmit a control message identifying the selected connection; and
the communication device comprises a connection system adapted to receive the control message and, in response thereto, to connect the user communications over the selected connection.

116. The system of claim 115 further comprising another communication device adapted to receive the user communications over the selected connection.

117. The system of claim 115 further comprising another communication device adapted to transport the user communications to the communication device.

118. The system of claim 112 wherein:
the signaling processor is adapted to process the call signaling to select a connection for the user communications and to transmit a control message identifying the selected connection; and
the communication device comprises an interworking unit adapted to receive the control message and, in response thereto, to interwork the user communications over the selected connection.

119. The system of claim 112 wherein:
the signaling processor is adapted to process the call signaling to select a time division multiplex connection for the user communications and to transmit a control message identifying the selected connection; and
the communication device comprises an interworking unit adapted to receive the control message and, in response thereto, to connect the user communications from a time division multiplex connection over the selected time division multiplex connection.

120. The system of claim 112 wherein:
the signaling processor is adapted to process the call signaling to select a connection for the user communications and to transmit a control message identifying the selected connection; and
the communication device comprises an asynchronous transfer mode matrix adapted to receive the control message and, in response thereto, to connect the user communications over the selected connection.

121. The system of claim 112 wherein the signaling processor further is adapted to remove an appended 1 from the ported number processing parameter after the call signaling has been processed to determine a processing option or a connection for the call.

122. The system of claim 112 wherein the signaling processor further is adapted to determine new call signaling and to transmit new call signaling after the signaling processor has processed the call signaling for one of the ported call or the non-ported call.

123. The system of claim 112 wherein the signaling processor further is adapted to process the call signaling to determine if the call is the ported call or the non-ported call.

124. The system of claim 112 wherein the ported number parameter comprises one or more of a forward call indicator parameter and a ported number generic address parameter.

125. The system of claim 112 wherein:
the signaling processor further is adapted to transmit a query requesting ported number information and to process a response to the query; and
the communication device comprises a ported number database adapted to receive the query, to process the query, and to transmit a response to the query, the response having ported number information.

126. The system of claim 125 wherein the response comprises a location routing number and wherein the signaling processor further is adapted to process the call as the ported call.

127. The system of claim 125 wherein the response comprises dialed number digits and wherein the signaling processor further is adapted to process the call as the non-ported call.

128. The system of claim 112 wherein the communication device comprises a switch adapted to transmit the call signaling to the signaling processor.

129. The system of claim 112 wherein the communication device comprises a switch adapted to receive new call signaling from the signaling processor.

130. A system for connecting a call having call signaling and user communications, the system comprising:
a signaling processor adapted to receive the call signaling, to process the call signaling to determine if the call is a ported call, and, if the call is the ported call, to partition the call for further processing within the signaling processor as the ported call by appending a 1 to a ported number processing parameter; and
a communication device adapted to receive, to handle, or to transmit at least one of a group of the call signaling, the user communications, and a control message.

131. The system of claim 130 wherein the ported number processing parameter comprises a nature of address field.

132. The system of claim 130 wherein the signaling processor further is adapted to process call signaling parameters to determine a processing option or a connection for the call.

133. The system of claim 132 wherein the signaling processor further is adapted to process the call signaling parameters with routing logic to determine the processing option or the connection for the call.

134. The system of claim 132 wherein the signaling processor further is adapted to process the call signaling parameters with routing tables to determine the processing option or the connection for the call.

135. The system of claim 130 wherein:
the signaling processor is adapted to process the call signaling to select a connection for the user communications and to transmit a control message identifying the selected connection; and
the communication device comprises a connection system adapted to receive the control message and, in response thereto, to connect the user communications over the selected connection.

136. The system of claim 135 further comprising another communication device adapted to receive the user communications over the selected connection.

137. The system of claim 135 further comprising another communication device adapted to transport the user communications to the communication device.

138. The system of claim 130 wherein:
the signaling processor is adapted to process the call signaling to select a connection for the user communications and to transmit a control message identifying the selected connection; and
the communication device comprises an interworking unit adapted to receive the control message and, in response thereto, to interwork the user communications over the selected connection.

139. The system of claim 130 wherein:
the signaling processor is adapted to process the call signaling to select a time division multiplex connection for the user communications and to transmit a control message identifying the selected connection; and
the communication device comprises an interworking unit adapted to receive the control message and, in response thereto, to connect the user communications from a time division multiplex connection over the selected time division multiplex connection.

140. The system of claim 130 wherein:
the signaling processor is adapted to process the call signaling to select a connection for the user communications and to transmit a control message identifying the selected connection; and
the communication device comprises an asynchronous transfer mode matrix adapted to receive the control message and, in response thereto, to connect the user communications over the selected connection.

141. The system of claim 130 wherein the signaling processor further is adapted to remove an appended 1 from the ported number processing parameter after the call signaling has been processed to determine a processing option or a connection for the call.

142. The system of claim 130 wherein the signaling processor further is adapted to determine new call signaling and to transmit new call signaling after the signaling processor has processed the call signaling for one of the ported call or the non-ported call.

143. The system of claim 130 wherein the signaling processor further is adapted to process the call signaling to determine if the call is the ported call or the non-ported call.

144. The system of claim 143 wherein the signaling processor further is adapted to determine if a ported number parameter is present in the call signaling.

145. The system of claim 144 wherein the ported number parameter is present in the call signaling and wherein the signaling processor further is adapted to process the call as the ported call.

146. The system of claim 144 wherein the ported number parameter comprises a forward call indicator parameter.

147. The system of claim 146 wherein the ported number parameter further comprises a ported number generic address parameter.

148. The system of claim 144 wherein the ported number parameter comprises a ported number generic address parameter.

149. The system of claim 130 wherein:
the signaling processor further is adapted to transmit a query requesting ported number information and to process a response to the query; and
the communication device comprises a ported number database adapted to receive the query, to process the query, and to transmit a response to the query, the response having ported number information.

150. The system of claim 149 wherein the response comprises a location routing number and wherein the signaling processor further is adapted to process the call as the ported call.

151. The system of claim 149 wherein the response comprises dialed number digits and wherein the signaling processor further is adapted to process the call as the non-ported call.

152. The system of claim 130 wherein the communication device comprises a switch adapted to transmit the call signaling to the signaling processor.

153. The system of claim 130 wherein the communication device comprises a switch adapted to receive new call signaling from the signaling processor.

154. A system for connecting a call having call signaling and user communications, the system comprising:

a signaling processor adapted to receive the call signaling, to process the call signaling to determine if the call is a ported call, and, if the call is the ported call, to partition the call for further processing within the signaling processor as a ported call by appending a 1 to a nature of address field of a called party number field parameter of the call signaling; and a communication device adapted to receive, to handle, or to transmit at least one of a group of the call signaling, the user communications, and a control message.

155. A method for connecting a call having call signaling and user communications, the method comprising:

receiving the call signaling and processing the call signaling;

partitioning the call for processing as a ported call by appending a 1 to a ported number processing parameter of a call signaling parameter;

partitioning the call for processing as a non-ported call by not appending the 1 to the ported number processing parameter; and receiving, handling, and/or transmitting at least one of a group of the call signaling, the user communications, and a control message at a communication device.

156. The method of claim 155 wherein the ported number processing parameter comprises a nature of address field.

157. The method of claim 155 further comprising processing call signaling parameters to determine a processing option or a connection for the call.

158. The method of claim 157 further comprising processing the call signaling parameters with routing logic to determine the processing option or the connection for the call.

159. The method of claim 157 further comprising processing the call signaling parameters with routing tables to determine the processing option or the connection for the call.

160. The method of claim 155 wherein the communication device comprises a connection system and the method further comprises:

selecting a connection for the user communications and transmitting a control message identifying the selected connection; and receiving the control message at the connection system and, in response thereto, connecting the user communications over the selected connection.

161. The method of claim 160 receiving the user communications over the selected connection at another communications device.

162. The system of claim 160 further comprising transporting the user communications to the communication device from another communications device.

163. The method of claim 155 wherein the communication device comprises an interworking unit and the method further comprises:

selecting a connection for the user communications and transmitting a control message identifying the selected connection; and receiving the control message at the interworking unit and, in response thereto, interworking the user communications over the selected connection.

164. The method of claim 155 wherein the communication device comprises an interworking unit and the method further comprises:

selecting a time division multiplex connection for the user communications and transmitting a control message identifying the selected connection; and receiving the control message at the interworking unit and, in response thereto, connecting the user communications from the time division multiplex connection over the selected time division multiplex connection.

165. The method of claim 155 wherein the communication device comprises asynchronous transfer mode matrix and the method further comprises:

selecting a connection for the user communications and transmitting a control message identifying the selected connection; and receiving the control message at the asynchronous transfer mode matrix and, in response thereto, connecting the user communications over the selected connection.

166. The method of claim 155 further comprising removing an appended 1 from the ported number processing parameter after the call signaling has been processed to determine a processing option or a connection for the call.

167. The method of claim 155 further comprising determining new call signaling and transmitting new call signaling after the call signaling has been processed for one of the ported call or the non-ported call.

168. The method of claim 155 further comprising processing the call signaling to determine if the call is the ported call or the non-ported call.

169. The method of claim 155 further comprising determining if a ported number parameter is present in the call signaling.

170. The method of claim 169 wherein the ported number parameter is present in the call signaling and wherein the method further comprises processing the call as the ported call.

171. The method of claim 169 wherein the ported number parameter comprises a forward call indicator parameter.

172. The method of claim 171 wherein the ported number parameter further comprises a ported number generic address parameter.

173. The method of claim 169 wherein the ported number parameter comprises a ported number generic address parameter.

174. The method of claim 155 further comprising:

transmitting a query requesting ported number information;

receiving and processing the query at a ported number database, wherein the communications device comprises the ported number database;

transmitting a response to the query from the ported number database, the response having ported number information; and processing the response to the query.

175. The method of claim 174 wherein the response comprises a location routing number and wherein the method further comprises processing the call as the ported call.

176. The method of claim 174 wherein the response comprises dialed number digits and wherein the method further comprises processing the call as the non-ported call.

177. The method of claim 155 wherein the communications device comprises a switch and the method further comprises transmitting the call signaling from the switch.

178. The method of claim 155 wherein the communications device comprises a switch and the method further comprises receiving new call signaling at the switch.

179. A method for connecting a call having call signaling and user communications, the method comprising:
  receiving the call signaling and processing the call signaling;
  partitioning the call for processing as a ported call by appending a 1 to a nature of address field of a called number party parameter;
  partitioning the call for processing as a non-ported call by not appending the 1 to the nature of address field; and
  receiving, handling, and/or transmitting at least one of a group of the call signaling, the user communications, and a control message at a communication device.

180. A method for connecting a call having call signaling and user communications, the method comprising:
  receiving the call signaling and processing the call signaling to determine if a ported number parameter is present;
  partitioning the call for processing as a ported call by appending a 1 to a ported number processing parameter if the ported number parameter is present; and
  receiving, handling, or transmitting at least one of a group of the call signaling, the user communications, and a control message at a communication device.

181. The method of claim 180 wherein the ported number processing parameter comprises a nature of address field.

182. The method of claim 180 further comprising processing call signaling parameters to determine a processing option or a connection for the call.

183. The method of claim 180 wherein the communication device comprises a connection system and the method further comprises:
  selecting a connection for the user communications and transmitting a control message identifying the selected connection; and
  receiving the control message at the connection system and, in response thereto, connecting the user communications over the selected connection.

184. The method of claim 183 receiving the user communications over the selected connection at another communications device.

185. The system of claim 183 further comprising transporting the user communications to the communication device from another communications device.

186. The method of claim 180 wherein the communication device comprises an interworking unit and the method further comprises:
  selecting a connection for the user communications and transmitting a control message identifying the selected connection; and
  receiving the control message at the interworking unit and, in response thereto, interworking the user communications over the selected connection.

187. The method of claim 180 wherein the communication device comprises an interworking unit and the method further comprises:
  selecting a time division multiplex connection for the user communications and transmitting a control message identifying the selected connection; and
  receiving the control message at the interworking unit and, in response thereto, connecting the user communications from the time division multiplex connection over the selected time division multiplex connection.

188. The method of claim 180 wherein the communication device comprises asynchronous transfer mode matrix and the method further comprises:
  selecting a connection for the user communications and transmitting a control message identifying the selected connection; and
  receiving the control message at the asynchronous transfer mode matrix and, in response thereto, connecting the user communications over the selected connection.

189. The method of claim 180 further comprising removing an appended 1 from the ported number processing parameter after the call signaling has been processed to determine a processing option or a connection for the call.

190. The method of claim 180 further comprising determining new call signaling and transmitting new call signaling after the call signaling has been processed for one of the ported call or the non-ported call.

191. The method of claim 180 further comprising processing the call signaling to determine if the call is the ported call or the non-ported call.

192. The method of claim 180 wherein the ported number parameter comprises one or more of a forward call indicator parameter and a ported number generic address parameter.

193. The method of claim 180 further comprising:
  transmitting a query requesting ported number information;
  receiving and processing the query at a ported number database, wherein the communications device comprises the ported number database;
  transmitting a response to the query from the ported number database, the response having ported number information; and
  processing the response to the query.

194. The method of claim 193 wherein the response comprises a location routing number and wherein the method further comprises processing the call as the ported call.

195. The method of claim 193 wherein the response comprises dialed number digits and wherein the method further comprises processing the call as the non-ported call.

196. The method of claim 180 wherein the communications device comprises a switch and the method further comprises transmitting the call signaling from the switch.

197. The method of claim 180 wherein the communications device comprises a switch and the method further comprises receiving new call signaling at the switch.

198. A method for connecting a call having call signaling and user communications, the method comprising:
  receiving the call signaling and processing the call signaling to determine if the call is a ported call;
  partitioning the call for further processing as the ported call by appending a 1 to a ported number processing parameter if the call is the ported call; and
  receiving, handling, or transmitting at least one of a group of the call signaling, the user communications, and a control message at a communication device.

199. The method of claim 198 wherein the ported number processing parameter comprises a nature of address field.

200. The method of claim 198 further comprising processing call signaling parameters to determine a processing option or a connection for the call.

201. The method of claim 200 further comprising processing the call signaling parameters with routing logic to determine the processing option or the connection for the call.

202. The method of claim 200 further comprising processing the call signaling parameters with routing tables to determine the processing option or the connection for the call.

203. The method of claim 198 wherein the communication device comprises a connection system and the method further comprises:

selecting a connection for the user communications and transmitting a control message identifying the selected connection; and receiving the control message at the connection system and, in response thereto, connecting the user communications over the selected connection.

204. The method of claim 203 receiving the user communications over the selected connection at another communications device.

205. The system of claim 203 further comprising transporting the user communications to the communication device from another communications device.

206. The method of claim 198 wherein the communication device comprises an interworking unit and the method further comprises:

selecting a connection for the user communications and transmitting a control message identifying the selected connection; and receiving the control message at the interworking unit and, in response thereto, interworking the user communications over the selected connection.

207. The method of claim 198 wherein the communication device comprises an interworking unit and the method further comprises:

selecting a time division multiplex connection for the user communications and transmitting a control message identifying the selected connection; and receiving the control message at the interworking unit and, in response thereto, connecting the user communications from the time division multiplex connection over the selected time division multiplex connection.

208. The method of claim 198 wherein the communication device comprises asynchronous transfer mode matrix and the method further comprises:

selecting a connection for the user communications and transmitting a control message identifying the selected connection; and receiving the control message at the asynchronous transfer mode matrix and, in response thereto, connecting the user communications over the selected connection.

209. The method of claim 198 further comprising removing an appended 1 from the ported number processing parameter after the call signaling has been processed to determine a processing option or a connection for the call.

210. The method of claim 198 further comprising determining new call signaling and transmitting new call signaling after the call signaling has been processed for one of the ported call or the non-ported call.

211. The method of claim 198 further comprising processing the call signaling to determine if the call is a ported call or a non-ported call.

212. The method of claim 198 further comprising determining if a ported number parameter is present in the call signaling.

213. The method of claim 212 wherein the ported number parameter is present in the call signaling and wherein the method further comprises processing the call as the ported call.

214. The method of claim 212 wherein the ported number parameter comprises a forward call indicator parameter.

215. The method of claim 214 wherein the ported number parameter further comprises a ported number generic address parameter.

216. The method of claim 212 wherein the ported number parameter comprises a ported number generic address parameter.

217. The method of claim 198 further comprising:

transmitting a query requesting ported number information;

receiving and processing the query at a ported number database, wherein the communications device comprises the ported number database;

transmitting a response to the query from the ported number database, the response having ported number information; and processing the response to the query.

218. The method of claim 217 wherein the response comprises a location routing number and wherein the method further comprises processing the call as the ported call.

219. The method of claim 217 wherein the response comprises dialed number digits and wherein the method further comprises processing the call as the non-ported call.

220. The method of claim 198 wherein the communications device comprises a switch and the method further comprises transmitting the call signaling from the switch.

221. The method of claim 198 wherein the communications device comprises a switch and the method further comprises receiving new call signaling at the switch.

222. A method for connecting a call having call signaling and user communications, the method comprising:

receiving the call signaling and processing the call signaling to determine if the call is a ported call;

partitioning the call for further processing as the ported call by appending a 1 to a nature of address field of a called party number field parameter of the call signaling if the call is the ported call; and receiving, handling, or transmitting at least one of a group of the call signaling, the user communications, and a control message at a communication device.

* * * * *